(12) United States Patent
Jeon et al.

(10) Patent No.: US 9,600,145 B2
(45) Date of Patent: Mar. 21, 2017

(54) MOBILE TERMINAL AND CONTROLLING METHOD THEREOF

(71) Applicant: LG ELECTRONICS INC., Seoul (KR)

(72) Inventors: Hyunjoo Jeon, Seoul (KR); Suyoung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 239 days.

(21) Appl. No.: 14/311,089

(22) Filed: Jun. 20, 2014

(65) Prior Publication Data

US 2015/0220218 A1 Aug. 6, 2015

(30) Foreign Application Priority Data

Jul. 10, 2013 (KR) .................. 10-2013-0081135

(51) Int. Cl.
  *G06F 3/0481* (2013.01)
  *G06F 3/0482* (2013.01)
  (Continued)

(52) U.S. Cl.
  CPC .......... *G06F 3/0482* (2013.01); *G06F 3/0412* (2013.01); *G06F 3/0488* (2013.01);
  (Continued)

(58) Field of Classification Search
  CPC ............... G06F 3/0482; G06F 3/04817; G06F 3/03549; G06F 1/1684
  See application file for complete search history.

(56) References Cited

U.S. PATENT DOCUMENTS

2007/0238489 A1* 10/2007 Scott .................. G06F 3/03549
  455/566
2010/0134432 A1* 6/2010 Seo ..................... G06F 3/04817
  345/173
(Continued)

FOREIGN PATENT DOCUMENTS

| EP | 2175344 | 4/2010 |
|---|---|---|
| EP | 2602702 | 6/2013 |
| WO | 2013/010155 | 1/2013 |

OTHER PUBLICATIONS

European Patent Office Application Serial No. 14002198.1, Search Report dated Nov. 18, 2014, 7 pages.

*Primary Examiner* — Rashawn Tillery
(74) *Attorney, Agent, or Firm* — Lee, Hong, Degerman, Kang & Waimey

(57) ABSTRACT

A mobile terminal and controlling method thereof are disclosed, which facilitates a terminal to be used in further consideration of user's convenience. The present invention includes a touchscreen and a controller, if a $1^{st}$ touch gesture is received through the touchscreen, outputting a movable button pad including at least one $1^{st}$ touch button to the touchscreen in response to the received $1^{st}$ touch gesture, the controller, if a prescribed one of the at least one $1^{st}$ touch button is selected, enabling a prescribed function corresponding to the prescribed $1^{st}$ touch button. Accordingly, in controlling a touchscreen having a relatively large size, the present invention can provide a touch screen control environment for enhancing user's convenience.

26 Claims, 44 Drawing Sheets

(51) Int. Cl.
*G06F 3/0488* (2013.01)
*G06F 3/041* (2006.01)
*G06F 3/0484* (2013.01)

(52) U.S. Cl.
CPC ...... *G06F 3/04817* (2013.01); *G06F 3/04842* (2013.01); *G06F 3/04883* (2013.01); *G06F 3/04886* (2013.01); *G06F 2203/04101* (2013.01); *G06F 2203/04104* (2013.01); *G06F 2203/04803* (2013.01); *G06F 2203/04808* (2013.01)

(56) References Cited

U.S. PATENT DOCUMENTS

| | | | |
|---|---|---|---|
| 2010/0306650 A1* | 12/2010 | Oh | G06F 3/0482 715/702 |
| 2011/0169749 A1 | 7/2011 | Ganey et al. | |
| 2013/0212535 A1* | 8/2013 | Kim | G06F 3/0482 715/841 |
| 2014/0325443 A1* | 10/2014 | Kim | G06F 3/0482 715/825 |
| 2015/0331569 A1* | 11/2015 | Kang | G06F 1/1684 715/765 |

* cited by examiner

FIG. 10
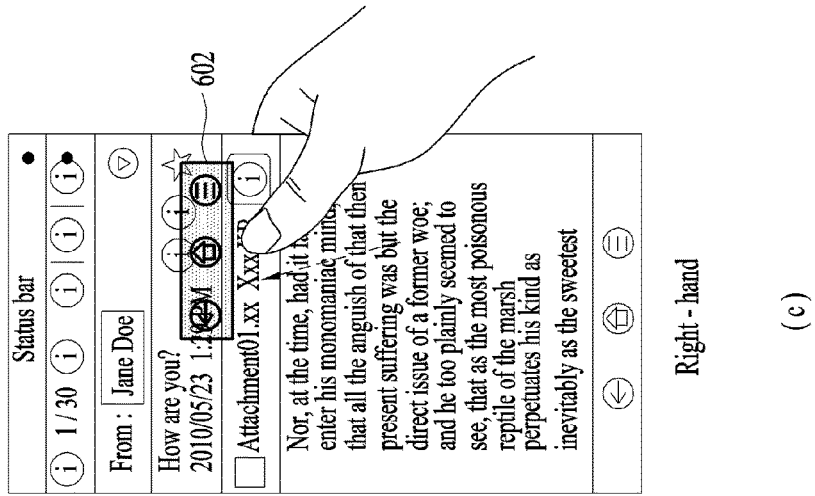
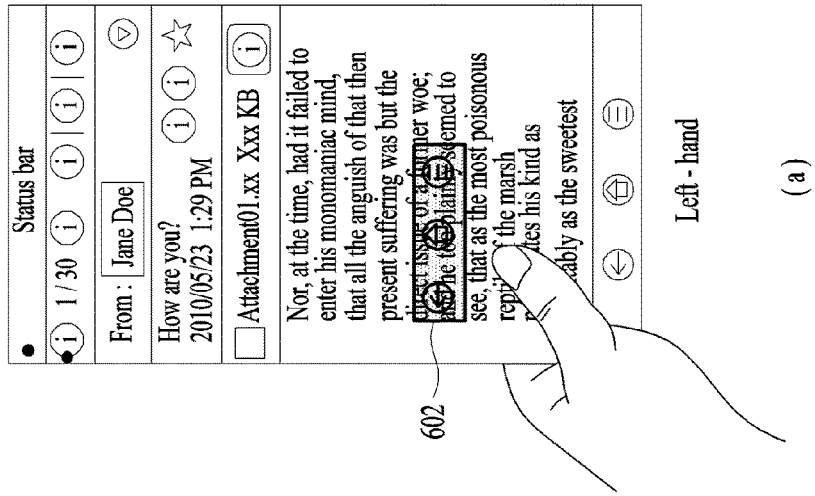

FIG. 13
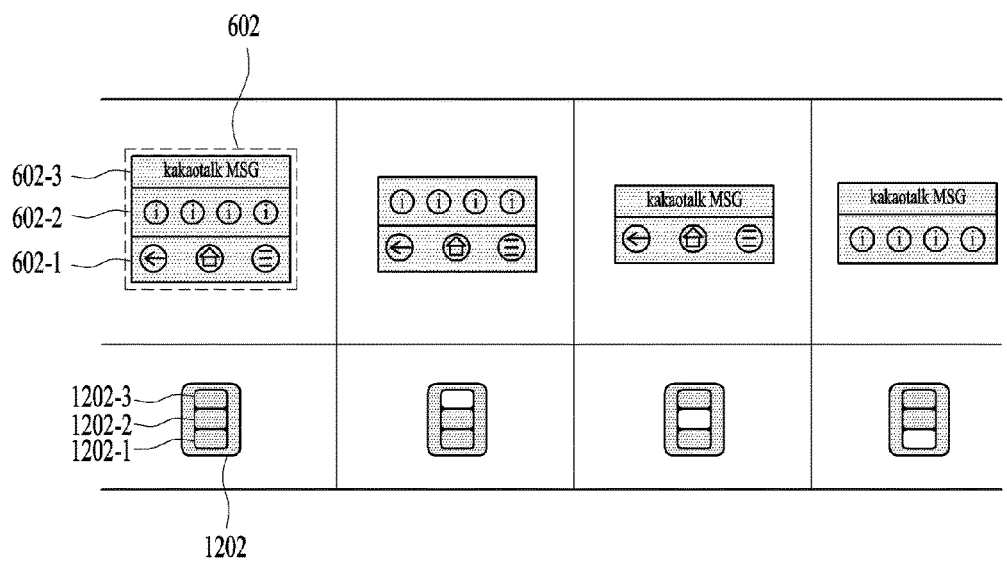
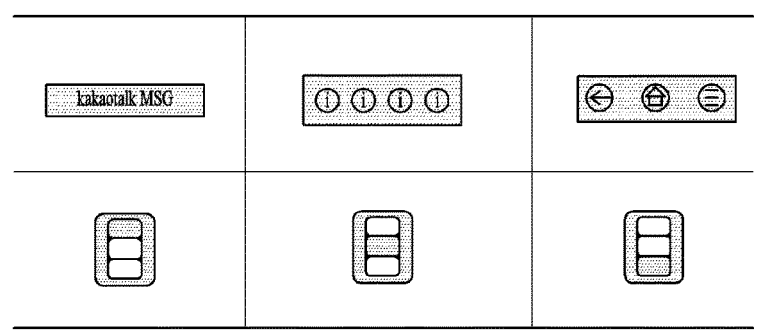

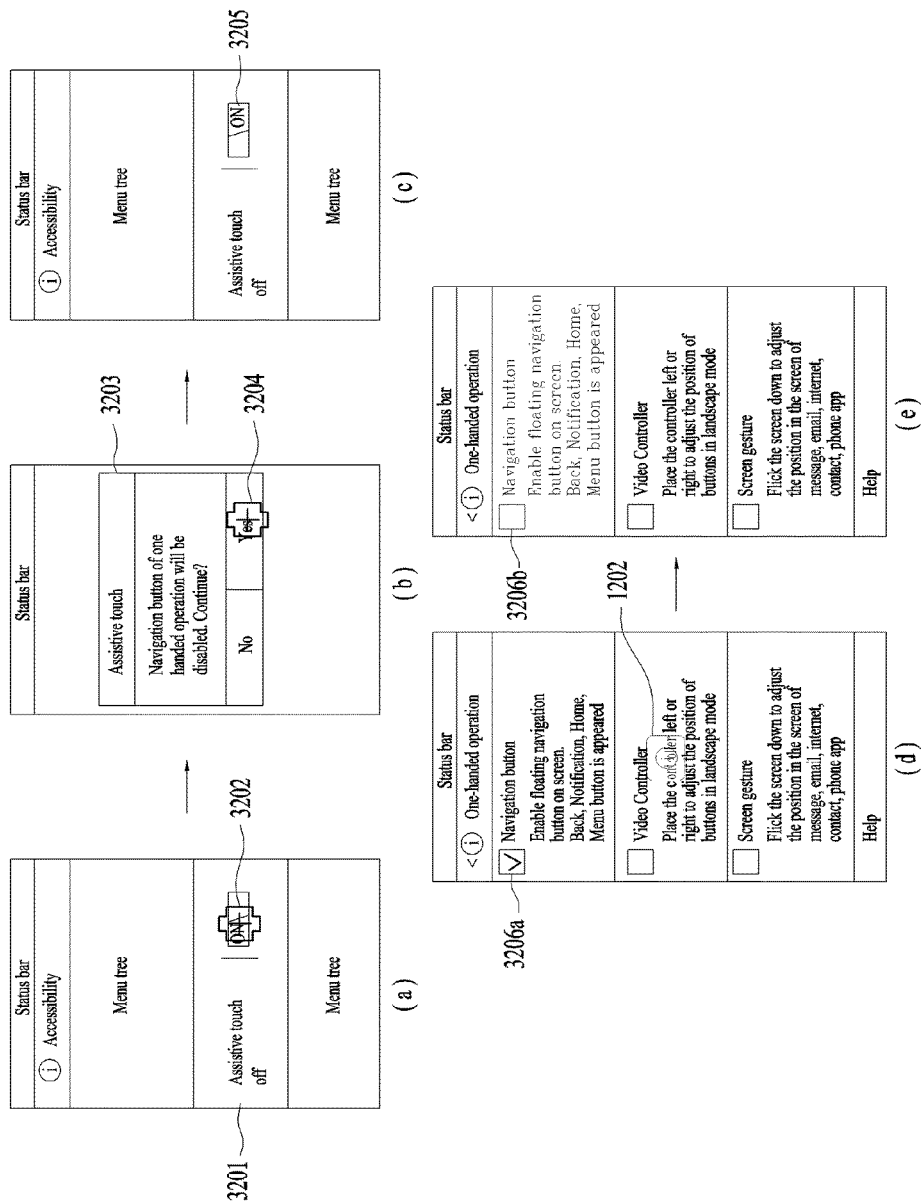

FIG. 34A
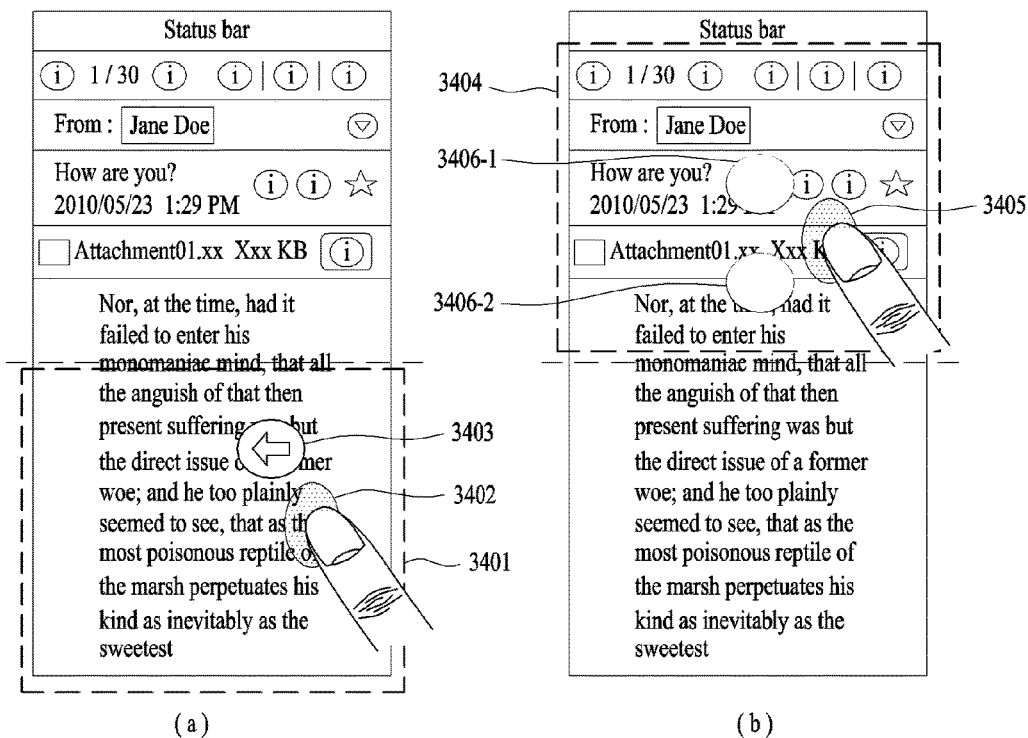
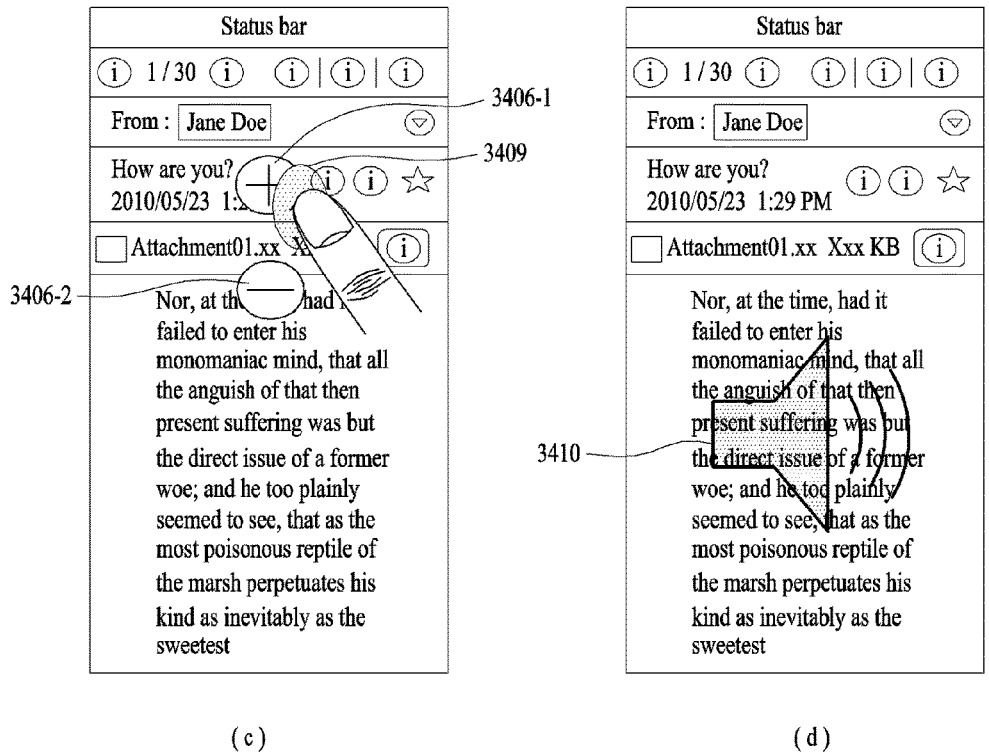

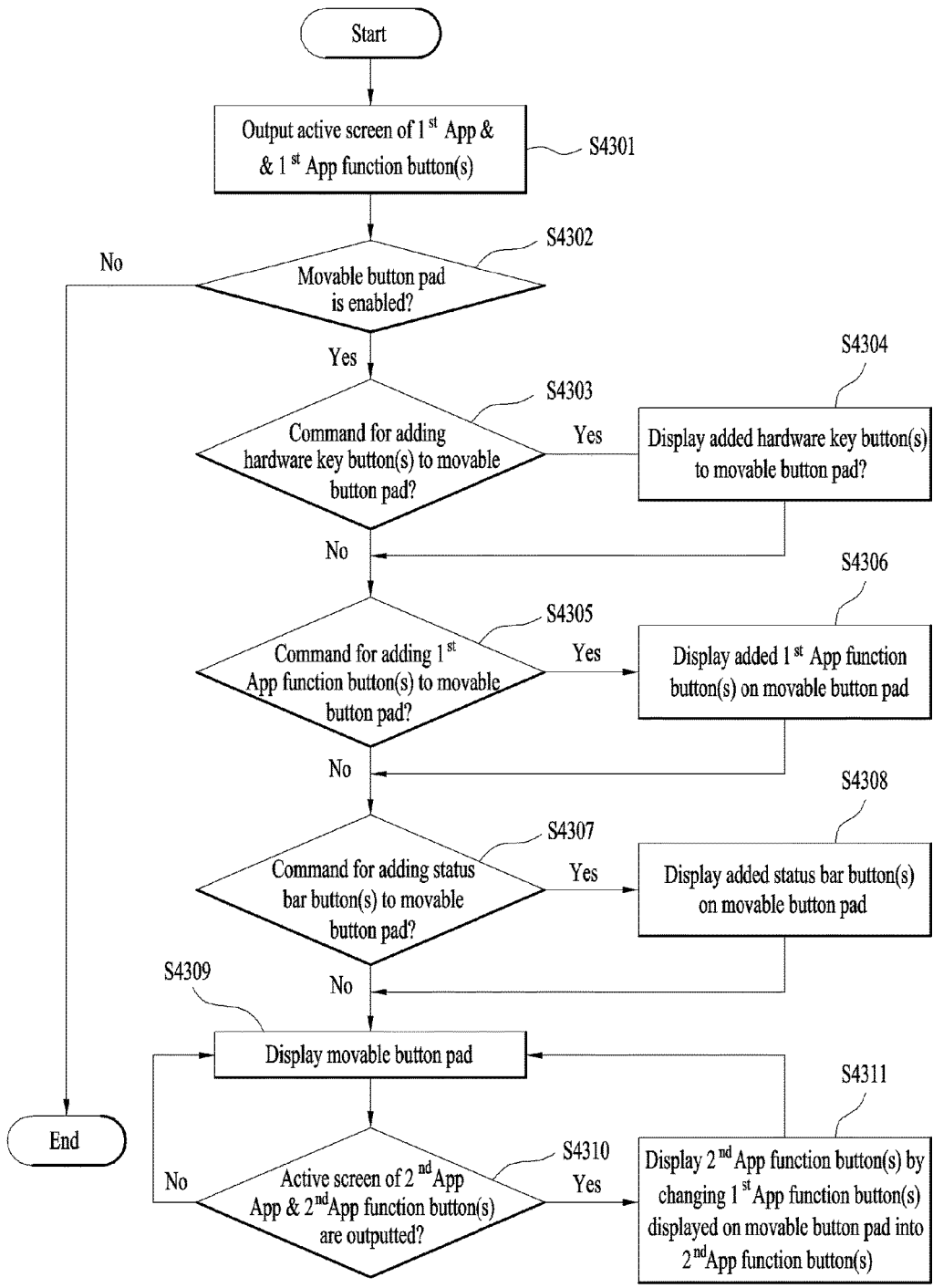

MOBILE TERMINAL AND CONTROLLING METHOD THEREOF

CROSS-REFERENCE TO RELATED APPLICATIONS

Pursuant to 35 U.S.C. §119(a), this application claims the benefit of earlier filing date and right of priority to Korean Application No. 10-2013-0081135, filed on Jul. 10, 2013, the contents of which are hereby incorporated by reference herein in their entirety.

BACKGROUND OF THE INVENTION

Field of the Invention

The present invention relates to a mobile terminal, and more particularly, to a mobile terminal and controlling method thereof. Although the present invention is suitable for a wide scope of applications, it is particularly suitable for facilitating a terminal to be used in further consideration of user's convenience.

Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

A size of a touchscreen provided to a terminal tends to increase gradually. Although a touchscreen having a wide screen is advantageous in providing a wide view to a user, however, it may cause inconvenience to a manipulation performed on the touchscreen. Particularly, when a user attempts to manipulate a terminal in a manner of gripping the terminal with one hand, there may be a region difficult to be touched with a finger in a plurality of regions of the touchscreen. Thus, the demand for a user screen interface suitable for a wide screen of a touchscreen is increasingly rising.

SUMMARY OF THE INVENTION

Accordingly, embodiments of the present invention are directed to a mobile terminal and controlling method thereof that substantially obviate one or more problems due to limitations and disadvantages of the related art.

One object of the present invention is to provide a mobile terminal and controlling method thereof, by which a manipulation of a touchscreen with a wide screen can be further facilitated.

Technical tasks obtainable from the present invention are non-limited by the above-mentioned technical tasks. And, other unmentioned technical tasks can be clearly understood from the following description by those having ordinary skill in the technical field to which the present invention pertains.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a mobile terminal according to the present invention may include a touchscreen and a controller, if a $1^{st}$ touch gesture is received through the touchscreen, outputting a movable button pad including at least one $1^{st}$ touch button to the touchscreen in response to the received $1^{st}$ touch gesture, the controller, if a prescribed one of the at least one $1^{st}$ touch button is selected, enabling a prescribed function corresponding to the prescribed $1^{st}$ touch button.

In another aspect of the present invention, as embodied and broadly described herein, a method of controlling a mobile terminal according to the present invention may include the steps of if a $1^{st}$ touch gesture is received through a touchscreen, outputting a movable button pad including at least one $1^{st}$ touch button to the touchscreen in response to the received $1^{st}$ touch gesture and if a prescribed one of the at least one $1^{st}$ touch button is selected, enabling a prescribed function corresponding to the prescribed $1^{st}$ touch button.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings:

FIGS. 9 to 11 are diagrams for a method of changing a location of an activation icon by discriminating a left hand and a right hand from each other according to one embodiment of the present invention;

FIG. 13 is a diagram for one example of a display configuration of a reduced icon 1202 according to one embodiment of the present invention;

FIG. 32 is a diagram for one example of a method of automatically disabling a function of a movable button pad 602 according to one embodiment of the present invention;

FIG. 34A is a diagram for one example of a method of outputting an assistive icon according to one embodiment of the present invention;

FIG. 43 is a flowchart according to one embodiment of the present invention.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile terminals, such as mobile phones, user equipment, smart phones, mobile computers, digital broadcast terminals, personal digital assistants, portable multimedia players (PMP) and navigators.

Figure 1:
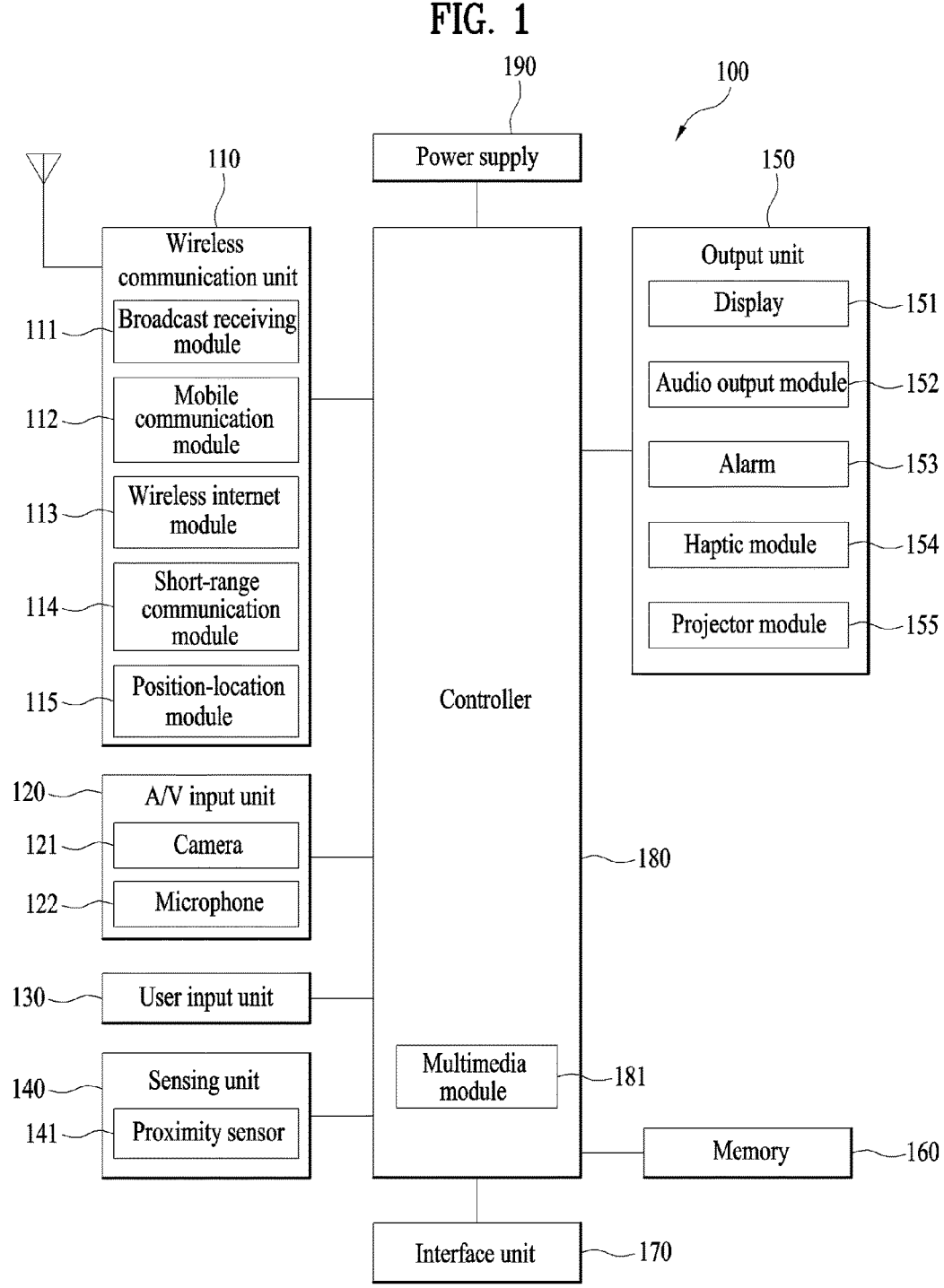
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

At least two broadcast receiving modules 111 can be provided to the mobile terminal 100 in pursuit of simultaneous receptions of at least two broadcast channels or broadcast channel switching facilitation.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), DVB-CBMS, OMA-BCAST, the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

According to the current technology, the GPS module 115 is able to precisely calculate current 3-dimensional position information based on at least one of longitude, latitude and altitude and direction (or orientation) by calculating distance information and precise time information from at least three satellites and then applying triangulation to the calculated information. Currently, location and time informations are calculated using three satellites, and errors of the calculated location position and time informations are then amended using another satellite. Besides, the GPS module 115 is able to calculate speed information by continuously calculating a real-time current location.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100, and free-falling of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and a sensor for detecting a touch action (hereinafter called 'touch sensor') configures a mutual layer structure (hereinafter called 'touchscreen'), it is able to use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Referring to FIG. 1, a proximity sensor (141) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display unit 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectable to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern (or image) recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2:
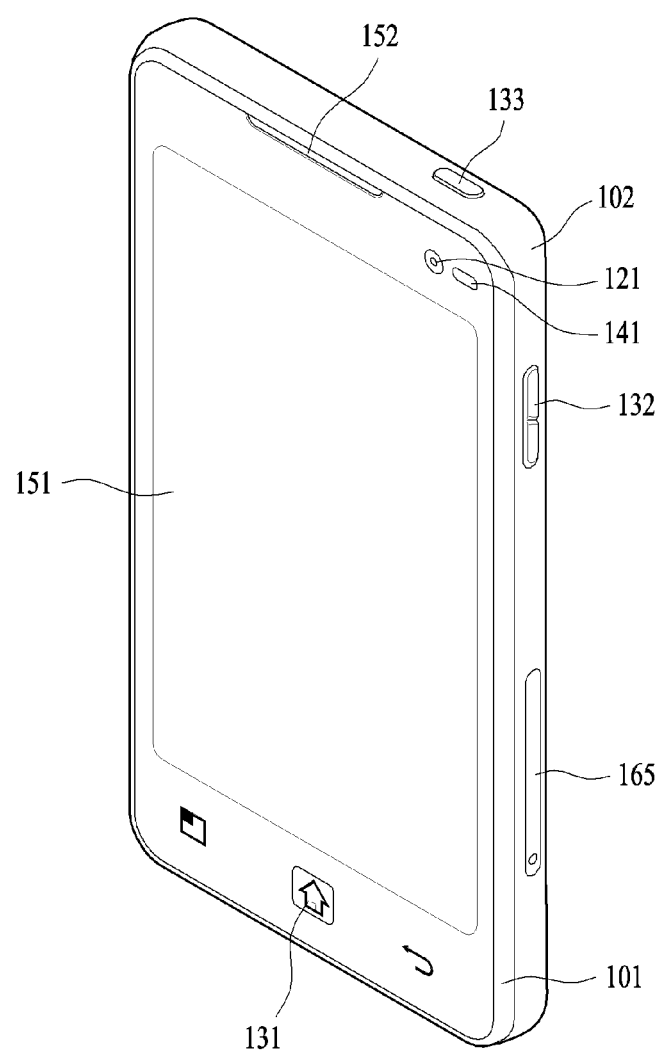
FIG. 2 is a front perspective diagram for one example of a mobile or portable terminal according to the present invention.

FIG. 2 is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the terminal body, and more particularly, to the front case 101.

The display 151 occupies most of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display 151 or the like can be inputted to the second manipulating unit 132.

Figure 3:
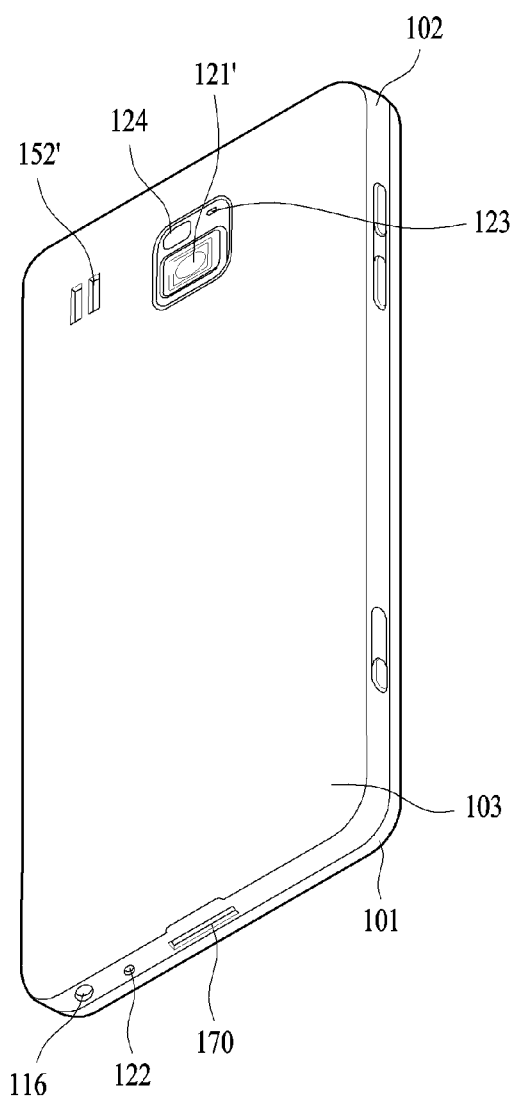
FIG. 3 is a rear perspective diagram of the mobile terminal shown in FIG. 2.

FIG. 3 is a perspective diagram of a backside of the terminal shown in FIG. 2.

Referring to FIG. 3, a camera 121' can be additionally provided to a backside of the terminal body, and more particularly, to the rear case 102. The camera 121 has a photographing direction that is substantially opposite to that of the former camera 121 shown in FIG. 21A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2 and may be used for implementation of a speakerphone mode in talking over the terminal.

A broadcast signal receiving antenna 116 can be additionally provided to the lateral side of the terminal body as well as an antenna for communication or the like. The antenna 116 constructing a portion of the broadcast receiving module 111 shown in FIG. 1 can be retractably provided to the terminal body.

Figure 4:
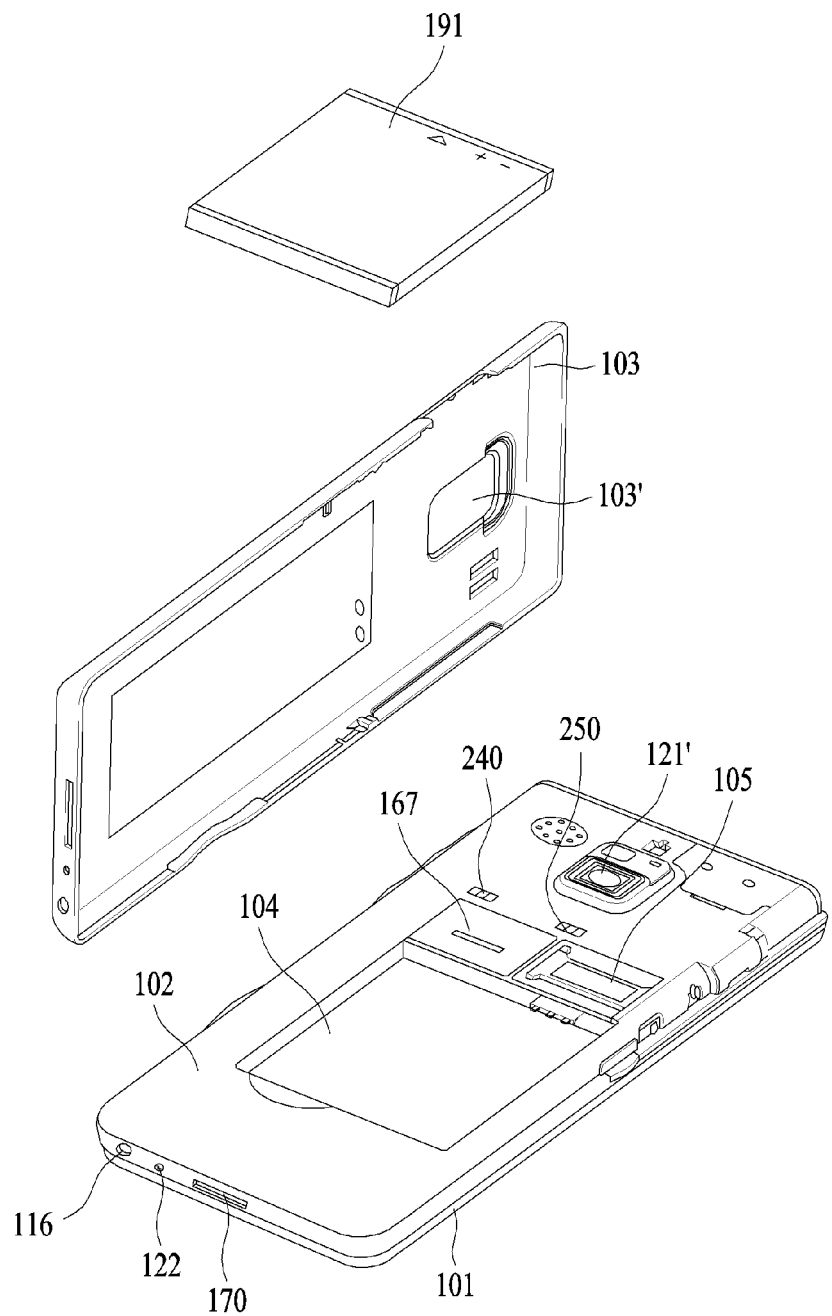
FIG. 4 is a rear perspective diagram of a surface of a rear case exposed by separating a rear cover of a mobile terminal according to one embodiment of the present invention.

FIG. 4 is a rear perspective diagram of a surface of a rear case exposed by separating a rear cover of a mobile terminal according to one embodiment of the present invention.

Referring to FIG. 4, a front case 101, a rear case 102, a rear cover (or a battery cover) 103, a camera 121', an interface unit 170, a microphone 122, a speaker module 154, an audio output unit 152', a battery 191, a battery loading unit 104, a USIM card loading unit 166, and a memory card loading unit 167 are provided.

A space for mounting such an external part as the battery loading unit 104, the USIM card loading unit 105, the memory card loading unit 106 and the like can be provided to a surface of the rear case 102. Generally, the external part loaded on the surface of the rear case 102 is provided to extend functions of the mobile terminal 100 in order to meet the diversified functions of the mobile terminal and a variety of the consumer's needs.

As the performance of the mobile terminal gets diverse, the battery 191 can be configured as a replaceable type, as shown in FIG. 4, to complement a considerable amount of power consumption. In case that the replaceable type is adopted, the battery loading unit 104 is formed on the surface of the rear case 102 to enable a user to detach the corresponding battery. In this case, a contact terminal is provided to the battery loading unit 104 to be electrically connected to a part installed within the case.

The USIM card loading unit 166 or the memory card loading unit 167 may be provided, as shown in FIG. 4, next to the battery loading unit 104. Alternatively, the USIM card loading unit 166 or the memory card loading unit 167 may be provided to a bottom surface of the battery loading unit 104. Hence, the battery 191 can be externally exposed if the battery 191 is unloaded from the battery loading unit 104. In this case, since a size of the battery loading unit 104 is extensible, the battery 191 can be oversized.

Although FIG. 4 shows the configuration that the USIM card loading unit 166 or the memory card loading unit 167 is mounted on a backside of the rear case 102, it can be inserted in or separated from the mobile terminal 100 in a manner of being inserted in a lateral side of the rear case 102.

The rear cover 103 covers the surface of the rear case 102. Hence, the rear cover 103 can fix the battery, 191, the USIM card, the memory card and the lime not to be separated from the rear case 102 and also protects the external parts from external shocks or particles. Recently, a waterproof function is added to the mobile terminal 100. In order to prevent the external parts from contacting with water, the mobile terminal 100 can further include a waterproof structure (not shown in the drawing). Hence, when rear case 102 and the rear cover 103 are connected to each other, the waterproof structure can seal up the gap between the rear case 102 and the rear cover 103.

Recently, a size of a touchscreen of the mobile terminal 100 tends to increases gradually. If the size increases gradually, it is advantageous in outputting more informations through the touchscreen. Yet, since the touchscreen is used not only as an output means, the size-increasing touchscreen may not be suitable to be used as an input means. For instance, if a user manipulates the touchscreen while gripping the mobile terminal with one hand, it may be difficult for the user to perform such an action due to an increasing size of the touchscreen.

Therefore, according to one embodiment of the present invention, proposed is a method of controlling the mobile terminal 100 using a large-sized touchscreen.

Particular, the present invention intends to provide methods of controlling the mobile terminal, by which prescribed function buttons outputted from the touchscreen and/or hardware buttons (e.g., the manipulating unit, the $1^{st}$ manipulating unit 131, the $2^{nd}$ manipulating unit 132, etc.) provided to a case configuring an exterior of the mobile terminal can be easily enabled. To this end, according to one embodiment of the present invention, a following method is provided. First of all, a 'movable button pad' including function buttons outputted from the touchscreen and/or hardware buttons (by copying the corresponding buttons) are outputted from the touchscreen. Secondly, the movable button pad can be shifted to a user-desired location (or position) [or, automatically shifted to a location or position at which a user can use the movable button pad conveniently]. Thirdly, the corresponding function buttons can be easily enabled (or activated) at the corresponding location (or position) using the movable button pad. In case that the touchscreen 151 has a large size, the movable button pad can improve user's accessibility to the function functions in a manner of gathering the function buttons distributed in a large area into a predetermined region and being shifted (or moved) to a user-desired location (or position). For instance, as the demand for a tablet PC (personal computer) having a touchscreen in a considerably large size is increasingly rising, effects and/or features of embodiments of the present invention can be maximized.

In the following description, controlling methods, which can be implemented in the above-configured mobile terminal, according to embodiments of the present invention are explained with reference to the accompanying drawings.

Figure 5:
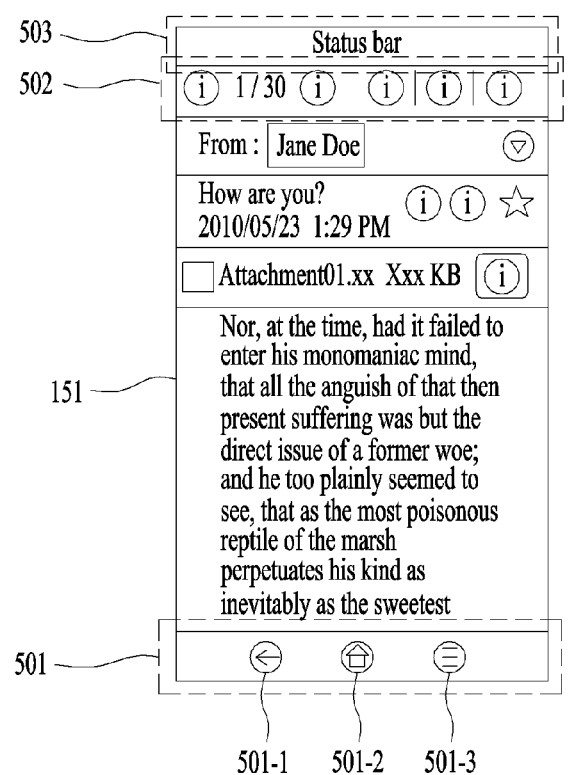
FIG. 5 is a diagram for one example of activation buttons outputtable through a touchscreen 151 to describe embodiments of the present invention.

FIG. 5 is a diagram for one example of activation buttons outputtable through the touchscreen 151 to describe embodiments of the present invention.

In the drawings provided to describe embodiments of the present invention, for clarity and convenience, an exterior shape of the mobile terminal 100 is omitted but diagrams of statuses outputted through the touchscreen 151 may be illustrated only.

Referring to FIG. 5, the touchscreen 151 currently outputs a status diagram of activating an email application. The controller 180 currently outputs a $1^{st}$ button region 501 to a most bottom end of the touchscreen 151. And, a plurality of buttons 501-1 to 501-3 are currently outputted from the $1^{st}$ button region 501.

Examples of the buttons outputted from the $1^{st}$ button region 501 shown in FIG. 5 are described as follows. First of all, the button 501-1 is a backward (or return) button. When a $1^{st}$ screen is switched to a $2^{nd}$ screen within an application activated screen, the button 501-1 is the button to return to the $1^{st}$ screen from the $2^{nd}$ screen. In particular, if the controller 180 receives a command for selecting the button 501-1 on the $2^{nd}$ screen, the controller 180 returns to the $1^{st}$ screen and is able to output the corresponding $1^{st}$ screen. Secondly, the button 501-2 is a home button. When an active screen of an application (or other screens) is currently outputted, the button 501-2 is the button to output a home screen.

The home screen is described in short as follows.

First of all, the home screen may be defined as a screen initially displayed on the touchscreen 151 if a locked state of the touchscreen 151 is cancelled (i.e., unlocked). And, at least one icon or widget for activating or enabling an application or an internal function may be displayed on the home screen. At least two home screens can exist in the mobile terminal 100. In this case, if a prescribed touch gesture is applied to the touchscreen 151, the at least two home screens can be sequentially displayed one by one. And, different icons (or widgets) may be displayed on each of the at least two home screens.

And, the button 501-3 is the button configured to page a menu list. In this case, the paged menu list can be outputted as a menu list suitable for a screen outputted at the timing point of inputting the menu list paging. For instance, while a home screen is outputted, if the button 501-3 is inputted, the controller 180 can page a menu list for setting a home screen. Yet, if the button 501-3 is inputted in the course of outputting a prescribed application, the controller 180 may be able to page a setting menu list of the corresponding application.

Meanwhile, the $1^{st}$ button region 501 and the buttons outputted from the $1^{st}$ button region 501 are just exemplary. And, it is apparent to those skilled in the art that other button regions and/or buttons of outer types can be displayed.

The $1^{st}$ button region 501 is described by taking the buttons 151 outputted from the touchscreen 151 as examples, by which the present invention may be non-limited. For instance, the principle of the $1^{st}$ button region 501 may be identically applicable to a case of hardware keys provided to the case configuring the exterior of the mobile terminal 100. In particular, one embodiment of the present invention can be applied to the backward button 501-1, the home screen button 501-2 and/or the menu paging button 501-3 configured with the hardware keys as well as with the software keys.

In the following description, a $2^{nd}$ button region 502 is explained. The $2^{nd}$ button region 502 currently outputs a function button of a prescribed application.

In the accompanying drawings including FIG. 5, function button/software buttons may be represented as circular icons, each of which has a letter 'i' displayed therein, in order not to non-limit the type of buttons shown in the corresponding drawings. The i-displayed circular icons may be included in the $1^{st}$ button region 501 and the $2^{nd}$ button region 502. And, the i-displayed circular icons may be included in an active screen of an application and/or a movable button pad and/or reduced icons according to one embodiment of the present invention.

For instance, it is able to output buttons to enable prescribed functions of the email application currently outputted by the controller 180. As one example of the buttons for enabling the prescribed functions of the email application, there may be at least one of a new mail compose button, a mail delete button and a refresh button. Types of the function buttons displayed on the $2^{nd}$ button region 502 may be changed depending on a type of the application displayed by the controller 180. For instance, in case that a web browser application is activated in the status shown in FIG. 5, function buttons for web browsing may be outputted from the $2^{nd}$ button region 502.

Referring to FIG. 5, the controller 180 may output a status bar 503 (e.g., a notification bar, an indication region, etc.) on a most top end of the touchscreen 151. In this case, the status bar means a region for performing a function of indicating various operation status (e.g., a current hour, a battery level, a radio signal reception strength, etc.) of the mobile terminal as prescribed forms in a manner of being always displayed on a prescribed region 503 of the touchscreen 151, as shown in FIG. 5, except a case that a prescribed application using a full screen is displayed. In order to raise user's accessibility to a setting screen of the mobile terminal 100, mobile terminals tends to use the status bar lately. For instance, if a touch & drag input is applied in a manner of touching the status bar 503 and then dragging the touched status bar 503 in bottom direction by maintaining the touch, the controller 180 can output a setting menu window that appears in a manner of being outputted and coming down from a top end. And, icons capable of controlling various setup values (e.g., on/off of Wi-Fi, on/off of Bluetooth, volume adjustment, screen brightness adjustment, etc.) of the mobile terminal 100 are displayed on the setting menu window.

In the following description, one example of a method of paging a movable button pad is explained in detail with reference to FIG. 6.

Method of Paging a Movable Button Pad

Figure 6:
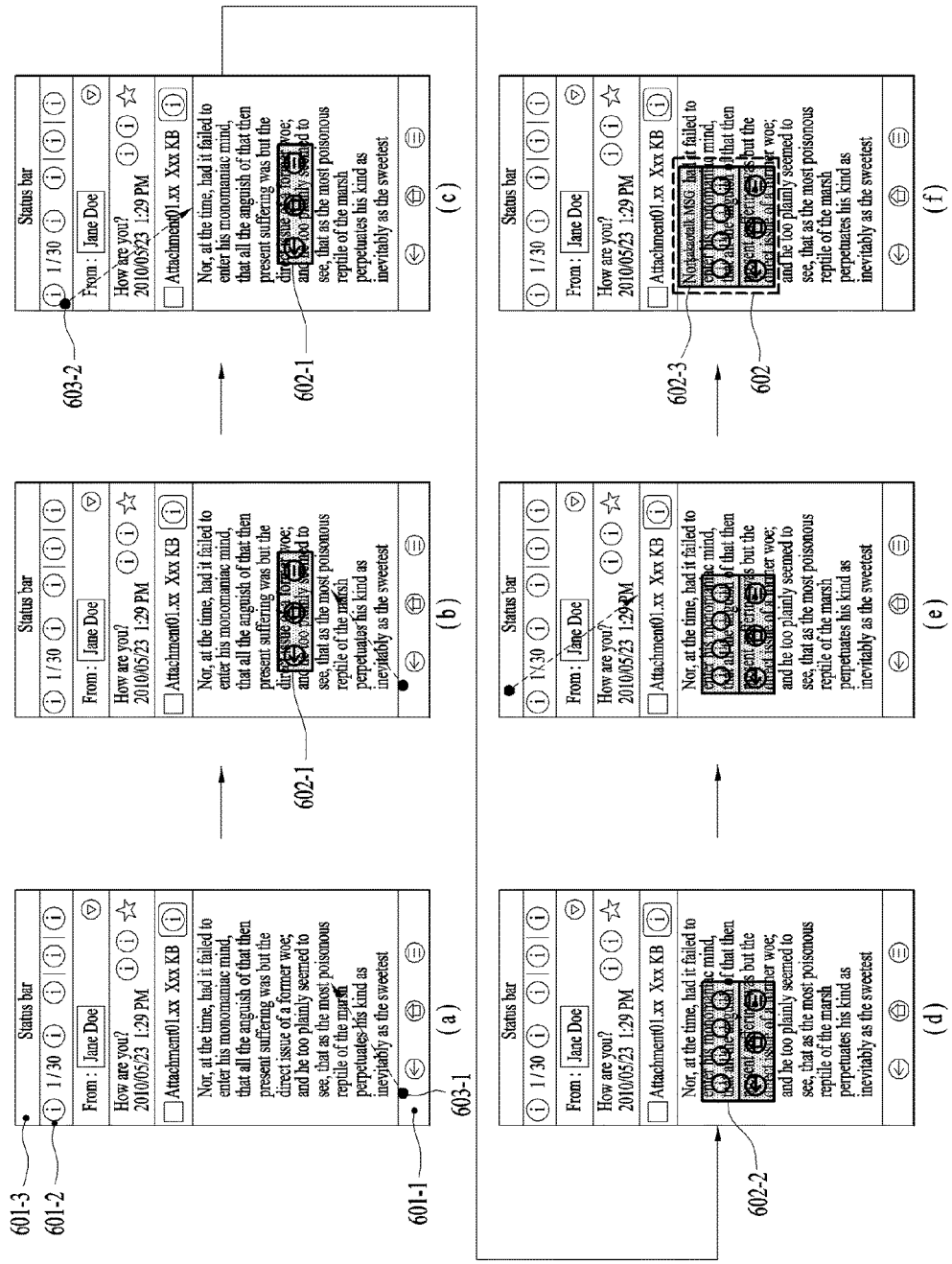
FIG. 6 is a diagram for one example of a method of paging a movable button pad according to one embodiment of the present invention.

FIG. 6 is a diagram for one example of a method of paging a movable button pad according to one embodiment of the present invention.

FIG. 6 is a status diagram of an active screen of an email application. In particular, FIG. 6(*a*) and FIG. 6(*b*) are diagrams to describe a process for adding the buttons 501-1 to 501-3 currently outputted from the $1^{st}$ button region 501 to a movable button pad.

According to one embodiment of the present invention, it is able to output activation icons 601-1 to 601-3 for adding buttons to the movable button pad. In particular, if the controller 180 receives an input of selecting the $1^{st}$ activation icon 601-1 for adding the buttons of the $1^{st}$ button region 501, the controller 180 can add some/all of the icons of the $1^{st}$ button region 501 to the activation icon (e.g., an input of touching the $1^{st}$ activation icon 601-1 and then dragging the touched $1^{st}$ activation icon 601-1 to a desired location (or position) by maintaining the touch, i.e., an input 603-1). In doing so, if the movable button pad is not enabled yet, it is able to add an icon by enabling the movable button pad. Referring to FIG. 6(*b*), it can be observed that a $1^{st}$ movable button pad 602-1 including the buttons of the $1^{st}$ button region 501 is outputted from the touchscreen 151.

Meanwhile, the above-described embodiment proposes the method of paging the movable button pad using the activation icon, by which the present invention may be non-limited. In particular, according to one embodiment of the present invention, proposed is to page a movable button pad using an input of a touch gesture. The reason for this is that it may be occasionally inconvenient or impossible to touch an activation icon at all. For instance, as one example of a touch gesture for paging a movable button pad, if the controller 180 receives a touch & drag input in a bottom-to-top direction (or a touch flicking input in a bottom-to-top direction), the controller 180 can activate the movable button pad.

FIG. 6(*c*) and FIG. 6(*d*) are diagram for an example of adding some/all of the function buttons included in the $2^{nd}$ button region 502 to the movable button pad according to one embodiment of the present invention.

Referring to FIG. 6(*c*), if the controller 180 receives an input of selecting the $2^{nd}$ activation icon 601-2 for adding the buttons of the $2^{nd}$ button region 502 to the movable button pad (e.g., an input of touching the $2^{nd}$ activation icon 601-2 and then dragging the touched $2^{nd}$ activation icon 601-2 to a desired location (or position) by maintaining the touch, i.e., an input 603-2), the controller 180 can add some or all of the buttons currently outputted from the $2^{nd}$ button region 502. If so, referring to FIG. 6(*d*), the controller 180 can output a $2^{nd}$ movable button pad 602-2 to which the buttons included in the $2^{nd}$ button region 502 are added.

Finally, an embodiment for adding the buttons included in the status bar 503 to the movable button pad is shown in FIG. 6(*e*) and FIG. 6(*f*).

If the controller 180 receives an input of selecting the $3^{rd}$ activation icon 601-3 for adding the buttons included in the status bar 503 to the movable button pad, the controller 180 can add the status bar buttons to the movable button pad. FIG. 6(*f*) shows a $3^{rd}$ movable button pad 602-3 to which the status bar buttons are added.

If a command for forming a group and then moving is received, the $1^{st}$ to $3^{rd}$ movable button pads 602-1 to 602-3 shown in FIG. 6 form a group and are then able to move to another location simultaneously. If a command for moving individually is received, a location of each of the $1^{st}$ to $3^{rd}$ movable button pads 602-1 to 602-3 can be shifted individually.

In the following description, assume that the movable button pads move to another location by forming a group unless moving individually. Hence, a reference number '602' is used to describe the $1^{st}$ to $3^{rd}$ movable button pads 602-1 to 602-3 as a group. And, the $1^{st}$ to $3^{rd}$ movable button pads 602-1 to 602-3 may be commonly named 'movable button pad'.

Meanwhile, some of the buttons currently outputted from the touchscreen 151 may be located to facilitate touches thereto. Yet, it may be difficult to touch other buttons. Therefore, according to one embodiment of the present invention, a method of selectively enabling/adding the touch-difficult buttons only in a movable button pad paging process is described as follows.

Figure 7:
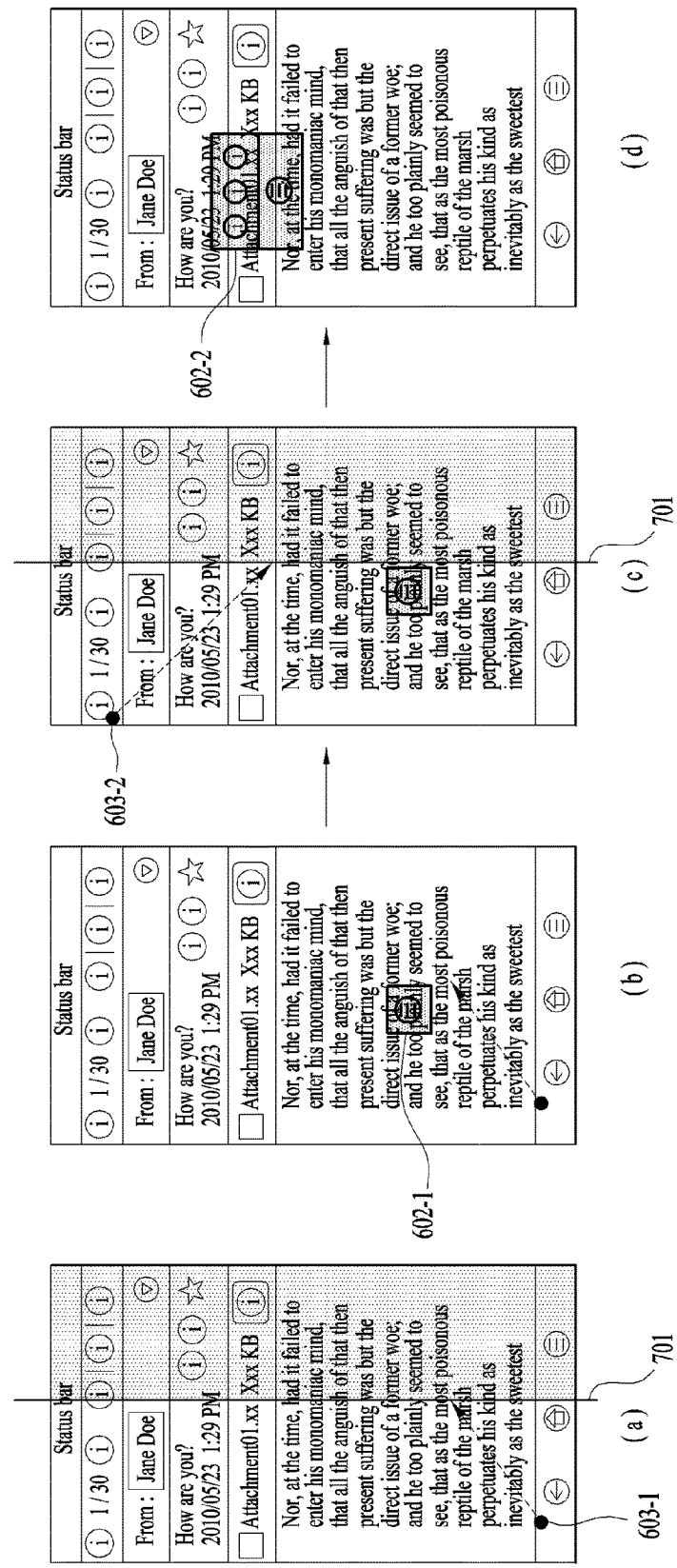
FIG. 7 is a diagram for one example of a method of additionally paging a prescribed button only in paging a movable button pad according to one embodiment of the present invention.

FIG. 7 is a diagram for one example of a method of additionally paging a prescribed button only in paging a movable button pad according to one embodiment of the present invention.

FIG. 7(*a*) is a diagram of a status of activating an email application. And, assume a situation that the mobile terminal 100 is gripped/manipulated with a left hand only. If so, it may be difficult to manipulate a right region of the touchscreen 151 using the left hand.

If the controller 180 receives an input 603-1 of selecting the $1^{st}$ activation icon 601-1, the controller 180 can output a $1^{st}$ movable button pad 602-1. When the touchscreen 151 is partitioned into two regions, if an input of selecting one of the two regions is received, buttons included in the selected region can be added to the $1^{st}$ movable button pad 602-1.

For instance, assume that a right region corresponding to a right side of a partition bar 701 is selected in FIG. 7(*a*). If the controller 180 receives the input 603-1 of selecting the $1^{st}$ activation icon 603-1, the controller 180 can output a menu paging button 501-3, which is the button corresponding to the selected right region in the $1^{st}$ button region 501, to the $1^{st}$ movable button pad 602-1. In doing so, as one example of the input of selecting one region, there is an input performed in a manner of touching the activation icon 601 and then dragging the activation icon 601 by maintaining the touch. Subsequently, the touchscreen 151 is partitioned into a right region and a left region with reference to a final location determined by the drag. It is then able to select a non-touched one of the right and left regions. The reason for this is explained as follows. First of all, if a touch is not performed, it is able to assume that a touch to a corresponding region is difficult. And, it is intended to add the buttons in the touch-difficult region to a movable button pad. Moreover, it is apparent that the input for designating the touch-difficult region may be non-limited by the above-mentioned input.

FIG. 7(c) and FIG. 7(d) show one example of adding some of the buttons included in the $2^{nd}$ button region 502 to the movable button pad 602.

After an input 603-2 of selecting the $2^{nd}$ activation button has been received, the touchscreen is partitioned into two regions. If one of the two regions is selected, the controller 180 may be able to add the buttons, which exist in the selected region among the buttons currently outputted from the $2^{nd}$ button region 502, to the movable button pad 602.

The movable button pad 602 created by the embodiment shown in FIG. 7 may include buttons less than those of the former movable button pad created by the embodiment shown in FIG. 6. Alternatively, the movable button pad 602 created by the embodiment shown in FIG. 7 may be configured with necessary buttons only by a user.

According to the embodiment described with reference to FIG. 7, the two virtual regions are discriminated from each other using the partition bar, by which embodiments of the present invention may be non-limited. In particular, according to one embodiment of the present invention, the controller 180 can receives a selection of one of a plurality of virtual regions resulting from partitioning the touchscreen 151 and is able to control buttons, which are included (or exist) in the selected virtual region, to the movable button pad 602.

So far, a method of enabling (or activating) a movable button pad has been described with reference to FIG. 6 and FIG. 6. In the following description, one example of a method of disabling a movable button pad is explained in detail with reference to FIG. 8.

Method of Disabling a Movable Button Pad

Figure 8:
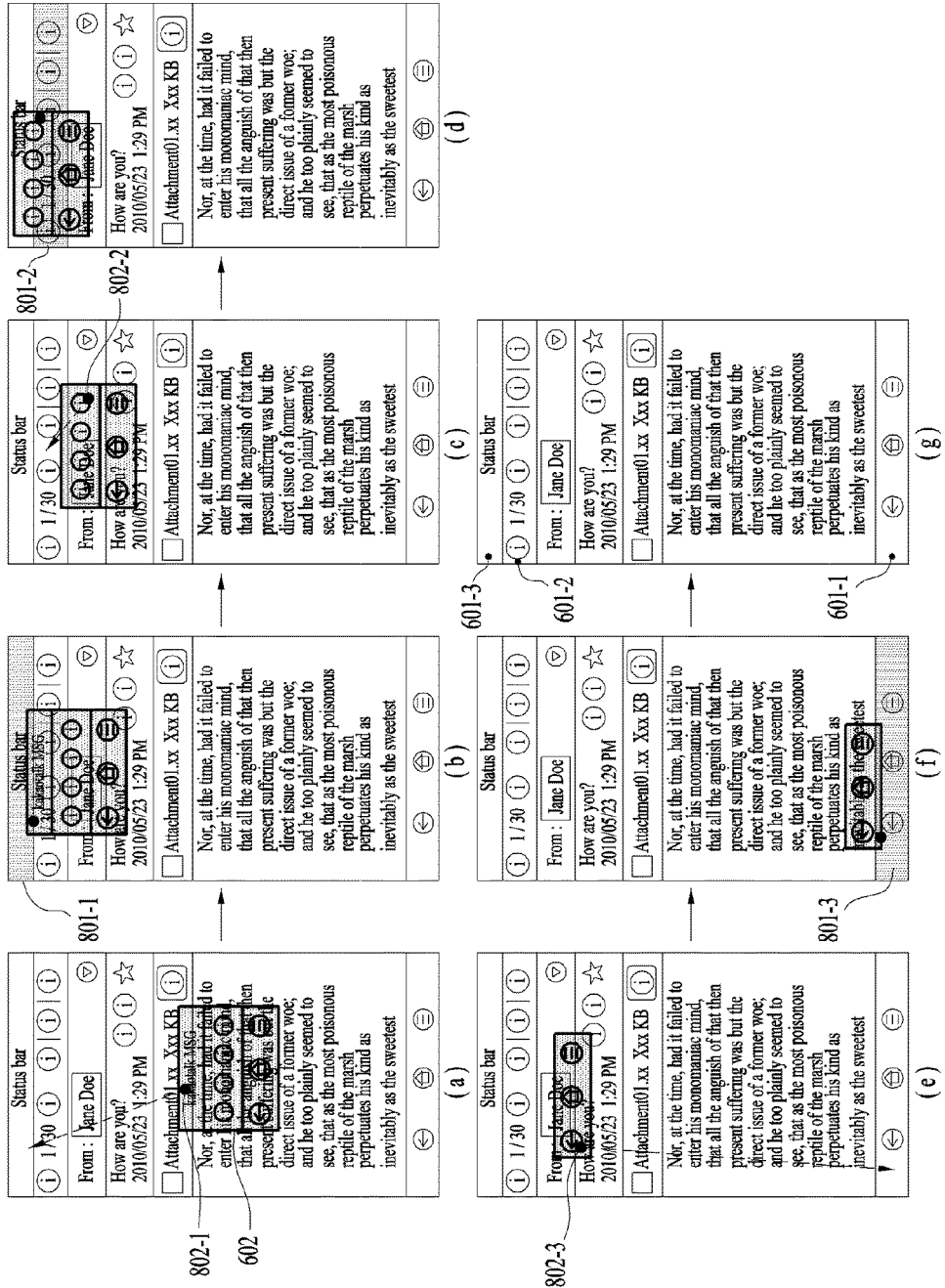
FIG. 8 is a diagram for one example of a method of disabling a movable button pad according to one embodiment of the present invention.

FIG. 8 is a diagram for one example of a method of disabling (or deactivating) a movable button pad according to one embodiment of the present invention.

Referring to FIG. 8(a), an active screen of an email application is currently outputted. And, the movable button pad 602 shown in FIG. 6 is currently outputted. According to one embodiment of the present invention, proposed are a controlling method for disabling the entire movable button pad 602 formed as a group and a controlling method for disabling each of the movable button pads 602-1 to 602-3 included in the group.

According to one embodiment of the present invention, it is able to independently disable each of the $1^{st}$ to the $3^{rd}$ movable button pads 602-1 to 602-3 belonging to the movable button pad 602.

FIG. 8(a) and FIG. 8(b) show a method of disabling the $3^{rd}$ movable button pad 602-3. A command for disabling the $3^{rd}$ movable button pad 602-3 may include a command performed in a manner of touching the $3^{rd}$ movable button pad 602-3 and then dragging it onto the status bar 503 by maintaining the touch. If the controller 180 receives the command for disabling the $3^{rd}$ movable button pad 602-3, the controller 180 may stop displaying the currently displayed $3^{rd}$ movable button pad 602-3. Moreover, the controller 180 outputs the $3^{rd}$ activation icon 601-3 for enabling (activating) the $3^{rd}$ movable button pad 602-3 again as soon as disables the $3^{rd}$ movable button pad 602-3.

FIG. 8(c) and FIG. 8(d) show a method of disabling the $2^{nd}$ movable button pad 602-2. Like the case of the $3^{rd}$ movable button pad 602-3, a command for disabling the $2^{nd}$ movable button pad 602-2 may include an input applied in a manner of touching the $2^{nd}$ movable button pad 602-2 and then dragging it to the $2^{nd}$ button region 502 by maintaining the touch. If the controller 180 receives the command for disabling the $2^{nd}$ movable button pad 602-2, the controller 180 may stop displaying the currently displayed $2^{nd}$ movable button pad 602-2. Moreover, the controller 180 outputs the $2^{nd}$ activation icon 601-2 for enabling (activating) the $2^{nd}$ movable button pad 602-2 again as soon as disables the $2^{nd}$ movable button pad 602-2.

FIG. 8(e) and FIG. 8(f) show a method of disabling the $1^{st}$ movable button pad 602-1. Like the case of the $2^{nd}$ movable button pad 602-2 or the $3^{rd}$ movable button pad 602-3, a command for disabling the $1^{st}$ movable button pad 602-1 may include an input applied in a manner of touching the $1^{st}$ movable button pad 602-1 and then dragging it to the $1^{st}$ button region 501 by maintaining the touch. If the controller 180 receives the command for disabling the $1^{st}$ movable button pad 602-1, the controller 180 may stop displaying the currently displayed $1^{st}$ movable button pad 602-1. Moreover, the controller 180 outputs the $1^{st}$ activation icon 601-1 for enabling (activating) the $1^{st}$ movable button pad 602-1 again as soon as disables the $1^{st}$ movable button pad 602-1.

Meanwhile, according to one embodiment of the present invention, in case of performing a one-hand action, it is determined whether a manipulation is performed using a left hand or a right hand. A user interface appropriate for a result of the determination is then provided. Such an embodiment shall be described in detail with reference to FIG. 9 as follows.

Operation by Discriminating a Touchscreen Manipulating Hand

According to one embodiment of the present invention, it is proposed to discriminate whether a hand, with which the touchscreen of the mobile terminal 100 is currently manipulated, is a right hand or a left hand. If the manipulating hand is discriminated, an interface suitable for the corresponding hand can be outputted.

In order to discriminate a right hand and a left hand, according to one embodiment of the present invention, the mobile terminal 100 includes a fingerprint recognition sensor. And, it is proposed to discriminate a right hand and a left hand based on whether a fingerprint detected through the fingerprint recognition sensor is a fingerprint of a right finger or a fingerprint of a left finger.

In order to discriminate a right hand and a left hand, according to one embodiment of the present invention, it is proposed that the mobile terminal 100 discriminates a right hand and a left hand based on a touch signal incorrectly recognized by the touchscreen 151. In particular, assuming that the touchscreen 151 is manipulated with a right thumb, when a touch in a considerable distance is applied, a user may make a mistake such that a right bottom edge of the touchscreen 151 is wrongly touched with a palm. Hence, if the controller 180 receives a touch signal determined as wrongly applied to the right bottom edge of the touchscreen 151, the controller 180 can determine that the manipulation is performed using a right hand.

In order to discriminate a right hand and a left hand, according to one embodiment of the present invention, it is proposed that the mobile terminal 100 discriminates a right hand and a left hand using an acceleration sensor or a gyro sensor. In particular, if the mobile terminal 100 is shaken using a hand with which the mobile terminal 100 is gripped, the mobile terminal 100 can determine whether the corresponding action is performed using a right hand or a left hand in consideration of an acceleration or direction of the shaking.

Besides, it is apparent to those skilled in the art that a method of discriminating a right hand and a left hand is non-limited by the above examples.

In the present specification, various embodiments of the present invention are described in a manner of discriminating a right hand and a left hand. And, the above-mentioned discriminating methods can be applied to the various embodiments of the present invention.

Figure 9:
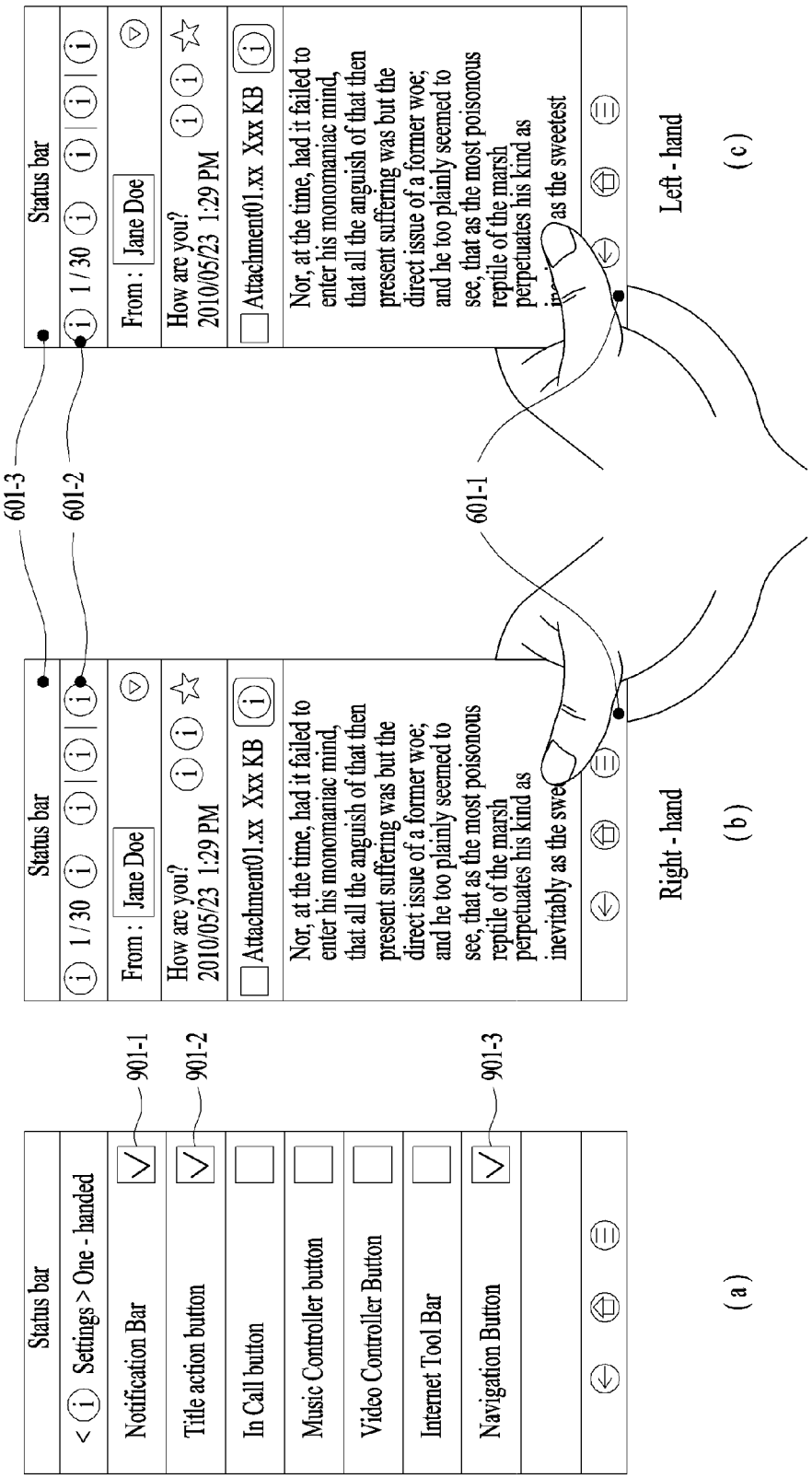
Figure 11:
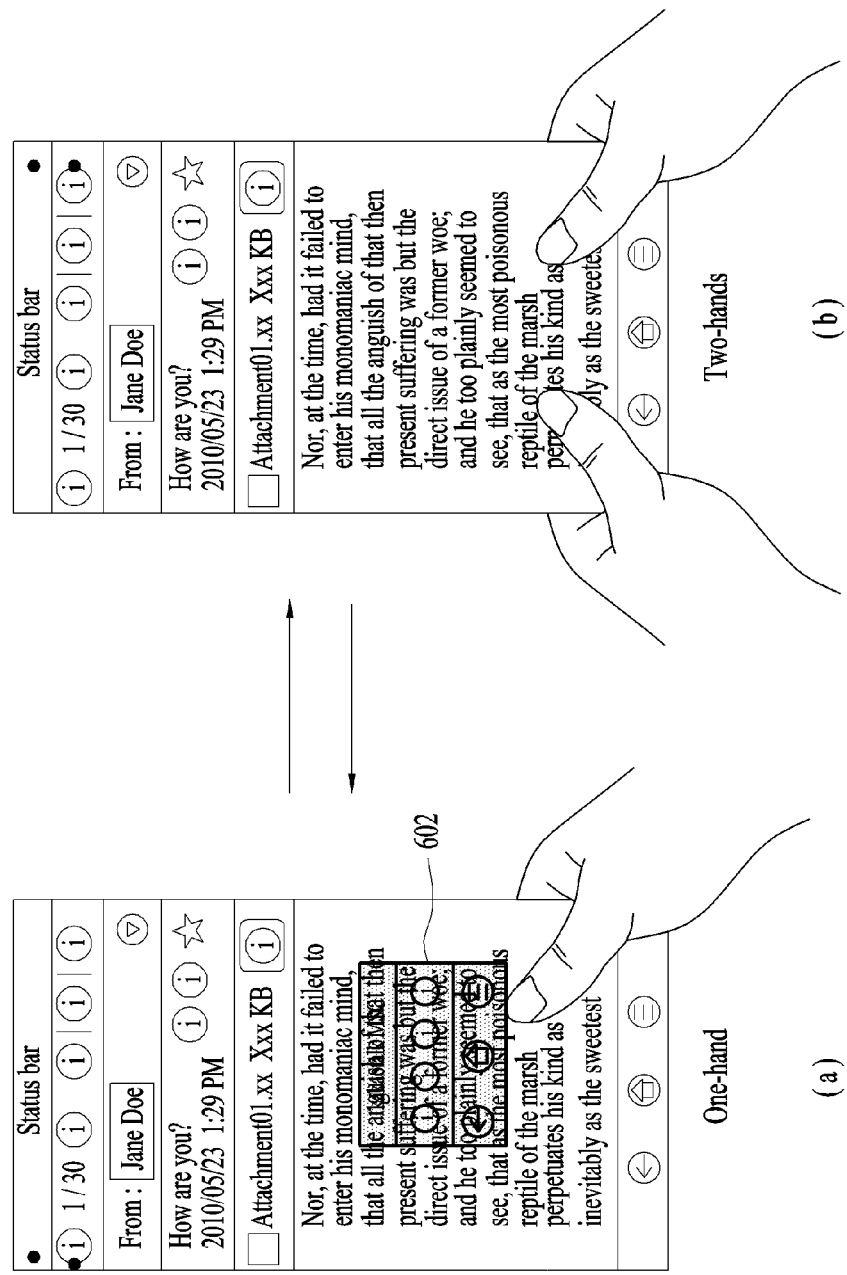

FIGS. 9 to 11 are diagrams for a method of changing a location of an activation icon by discriminating a left hand and a right hand according to one embodiment of the present invention.

First of all, an activation icon is an icon provided to page a movable button pad 602 according to one embodiment of the present invention. If it is difficult to touch the corresponding icon in itself, it may be unable to use the movable button pad 602 at all. Therefore, according to one embodiment of the present invention, it is discriminated whether a gripping or manipulating hand is a left hand or a right hand. And, it is proposed to output an activation icon in a manner of discriminating a location of the activation icon as a left side or a right side.

FIG. 9(a) is a status diagram of a setting screen for setting an item intended to be outputted in a manner of changing a location by discriminating a left hand and a right hand. A plurality of check boxes can be outputted from the setting screen. The controller 180 may be able to apply an embodiment of the present invention to the item selected through the check box.

For instance, in FIG. 9(a), assume that the check boxes 901-1 to 901-3 are checked. If so, locations (or positions) of activation icons for the status bar 503 (notification bar), the $1^{st}$ button region 501 (navigation button) and the $2^{nd}$ button region 502 (title action button) can be changed depending on a gripping hand.

For instance, if the gripping hand is a right hand, as shown in FIG. 9(b), the controller 180 can output the $1^{st}$ to $3^{rd}$ activation icons 601-1 to 601-3 to a right region of the touchscreen 151. For another instance, if the gripping hand is a left hand, as shown in FIG. 9(c), the controller 180 can output the $1^{st}$ to $3^{rd}$ activation icons 601-1 to 601-3 to a left region of the touchscreen 151.

Moreover, according to the present invention, it is proposed that the enabled movable button pad 602 is outputted in a manner of changing a location of the outputted movable button pad 602 depending on the discrimination between a left hand and a right hand. The reason for this is described as follows. First of all, since the movable button pad 620 is the entity outputted to facilitate a touch to a button provided to a region difficult to be touched by a single-handed action, if this entity is displayed on a location difficult to be touched with a gripping hand, the movable button pad 602 would be of no use.

In particular, referring to FIG. 10(a), as the mobile terminal 100 is gripped with a left hand, if the controller 180 detects a left-handed grip, it is proposed that the controller 180 outputs the movable button pad 602 to a location on a left region of the touchscreen 151.

In particular, referring to FIG. 10(b), as the mobile terminal 100 is gripped with a right hand, if the controller 180 detects a right-handed grip, it is proposed that the controller 180 outputs the movable button pad 602 to a location on a right region of the touchscreen 151.

Moreover, according to one embodiment of the present invention, it is proposed to output the movable button pad 620 in a manner of shifting a location of the outputted movable button pad 602 depending on a location of a gripping hand (or a location of a thumb of a griping hand). As mentioned in the foregoing description, the reason for this is to raise user's accessibility to buttons. In doing so, it may be able to determine the location of the gripping hand using a grip sensor. Alternatively, it may be able to determine the location of the gripping hand as a most recently touched location. Alternatively, it may be able to determine the location of the thumb of the gripping hand using a proximity sensor.

Moreover, according to one embodiment of the present invention, if a manipulation with one is switched to a manipulation with two hands, it is proposed to disable an output of the movable button pad 602. Since the movable button pad 602 is the object for facilitating manipulation on a button provided to a touch-difficult region in the course of manipulating the touchscreen 151 with one hand, it may be preferable that the movable button pad 602 is disabled in the course of manipulating the touchscreen 151 with two hands. Therefore, referring to FIG. 11(a) and FIG. 11(b), according to one embodiment of the present invention, if the controller 180 detects the two-handed gripping despite outputting the movable button pad 602 currently, the controller 180 disables the currently outputted movable button pad 602 not to output any more. If the controller 180 detects a manipulation with one hand again, as mentioned in the foregoing description with reference to FIG. 10, the controller 180 can output the movable button pad 602 to the right/left region of the touchscreen 151.

Minimization of Movable Button Pad

According to one embodiment of the present invention, since the movable button pad 602 includes a plurality of buttons, it may interrupt an output to a prescribed region of the touchscreen 151. Therefore, according to one embodiment of the present invention, if there is no input to the movable button pad 602, the controller 180 changes the movable button pad 602 into an icon (hereinafter named a reduced icon) 1202 resulting from minimizing the movable button pad 602 and is then able to output the icon 1202. A corresponding embodiment shall be described in detail with reference to FIG. 12 and FIG. 13 as follows.

Figure 12:
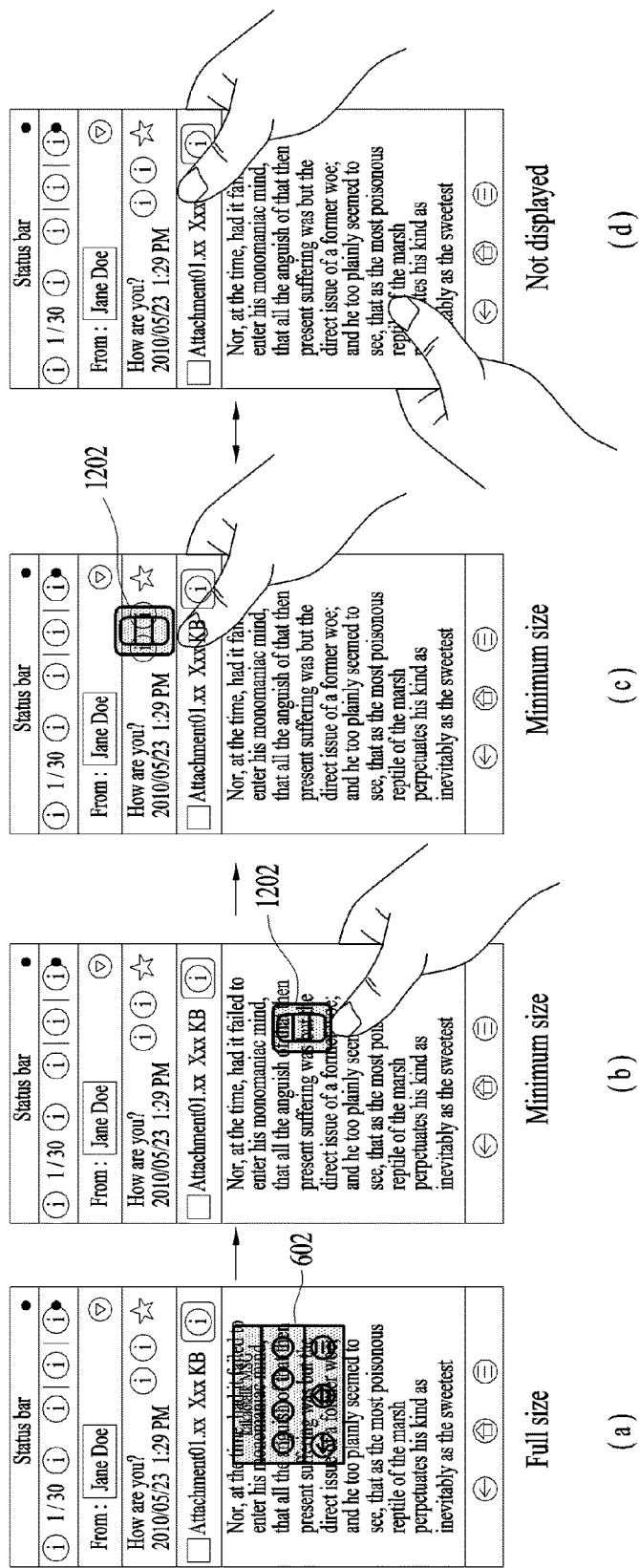
FIG. 12 is a diagram for one example of a method of minimizing to display a movable button pad 602 according to one embodiment of the present invention.

FIG. 12 is a diagram for one example of a method of minimizing to display the movable button pad 602 according to one embodiment of the present invention.

FIG. 12(a) is a diagram of an active status of an email application and the movable button pad 602 according to one embodiment of the present invention. If an input to the movable button pad 602 is not received over a prescribed duration (or a touch input to a point except the movable button pad 602 is received), the controller 180 can display a reduced icon 1202 instead of the movable button pad 602 [FIG. 12(b)].

In doing so, as mentioned in the foregoing description with reference to FIG. 10, a location at which the reduced icon 1202 is displayed can be changed depending on a location of a gripping hand (or, depending on whether the gripping hand is a right hand or a left hand) [FIG. 12(c)].

Moreover, as mentioned in the foregoing description with reference to FIG. 11, assuming a case that the mobile terminal 100 is gripped with two hands, the controller 180 may be able to disable an output of the reduced icon 1202 like the case of the movable button pad 602 [FIG. 12(d)].

FIG. 13 is a diagram for one example of a display configuration of a reduced icon 1202 according to one embodiment of the present invention.

Referring to FIG. 13, a reduced icon 1202 can change its shape depending on a state of a movable button pad 602 used to be displayed before being minimized. For instance, indicators 1202-1 to 1202-3 are displayed as many as the movable button pads 602 that can be enabled. And, it is able to display an object previously enabled before the minimization among the $1^{st}$ to $3^{rd}$ movable button pads 602-1 to 602-3.

Referring to a $1^{st}$ item shown in FIG. 13, when the enabled $1^{st}$ to $3^{rd}$ movable button pads 602-1 to 602-3 within the movable button pad 602 are minimized, a corresponding icon 1202 is displayed. In doing so, all of the indicators 1202-1 to 1202-3 are displayed within the reduced icon 1202 in a manner of being enabled. If some of the $1^{st}$ to $3^{rd}$ movable button pads 602-1 to 602-3 is/are disabled, some of the indicators 1202-1 to 1202-3 can be displayed in a manner of being disabled. Thus, the indicators 1202-1 to 1202-3 within the reduced icon 1202 indicate whether they are enabled/disabled, thereby delivering necessary information to a user.

So far, the above-mentioned embodiments are described on the assumption of the case that the $1^{st}$ button region 501 is the soft key type displayed on the bottom end of the touchscreen 151. In the following description, a case that the $1^{st}$ button region 501 corresponds to a hardware key is explained with reference to FIG. 14.

Figure 14:
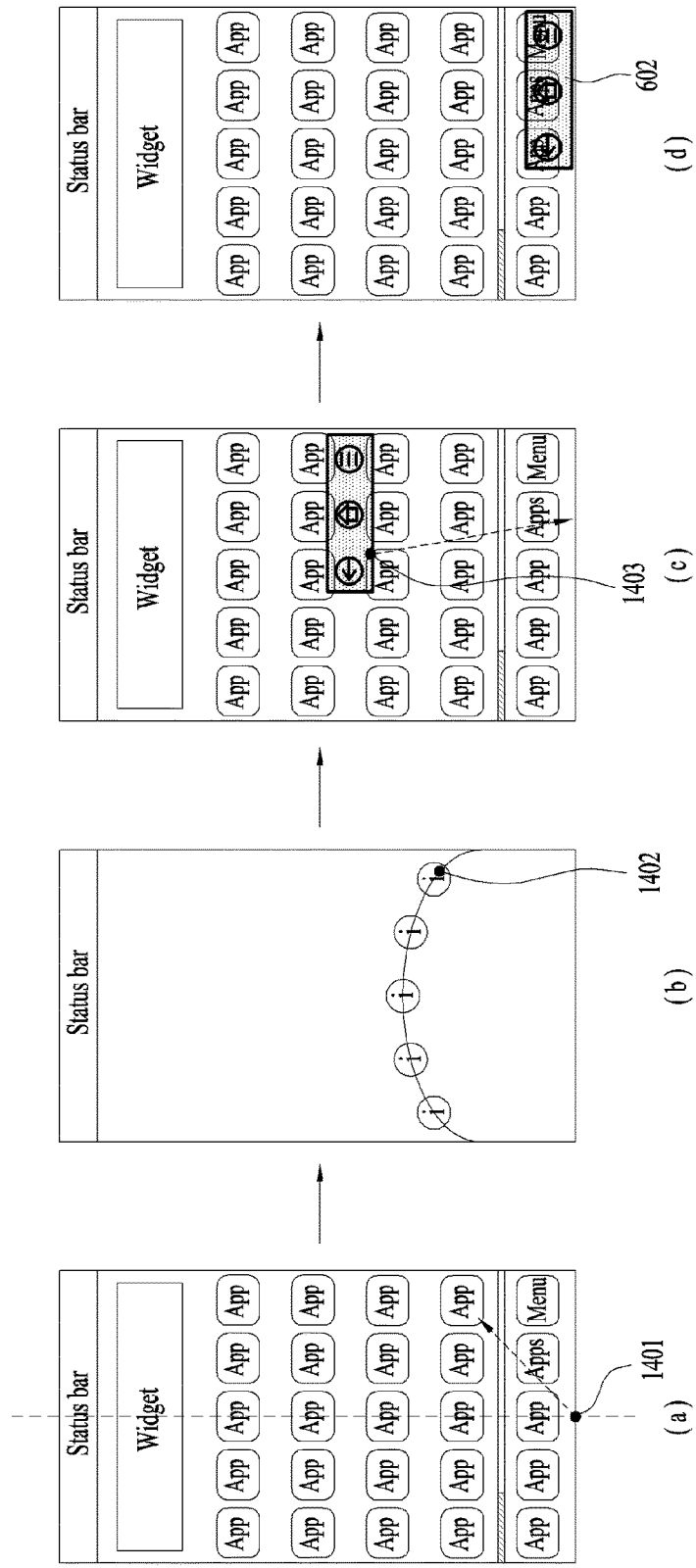
FIG. 14 is a diagram for one example of a method of paging a movable button pad 602 for a hardware key.

FIG. 14 is a diagram for one example of a method of paging a movable button pad 602 for a hardware key. FIG. 14(a) is a status diagram of a home screen. Referring to FIG. 14(a), any function button is not outputted from a bottom end of the touchscreen 151.

According to one embodiment of the present invention, if a prescribed touch gesture is inputted, proposed is to enable shortcut icons in response to the prescribed touch gesture. As one example of the prescribed touch gesture, there may be an input applied in a manner of touching a central lower part of the touchscreen 151 and then dragging in a diagonally right top direction [cf. a touch & drag input direction shown in FIG. 14(a)]. If a prescribed icon 1402 is selected from the enabled shortcut icons, the controller 180 can output the movable button pad 602 according to one embodiment of the present invention [FIG. 14(c)]. As one example of an input of disabling the enabled movable button pad 602, there may be an input applied in a manner of dragging the movable button pad 602 in a bottom end direction of the touchscreen 151 by maintaining a touch to the movable button pad 602 [FIG. 14(c), FIG. 14(d)].

Figure 15:
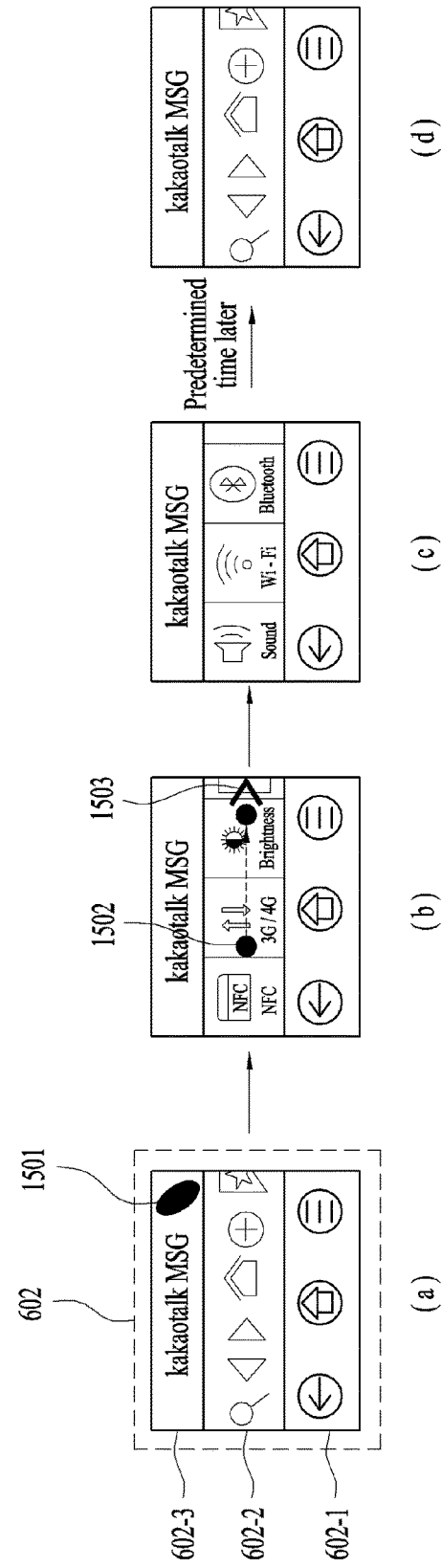
FIG. 15 is a diagram for one example of buttons of a movable button pad 602 according to one embodiment of the present invention.

FIG. 15 is a diagram for one example of buttons of a movable button pad 602 according to one embodiment of the present invention.

Referring to FIG. 15(a), a movable button pad 602 may include $1^{st}$ to $3^{rd}$ movable button pads 602-1 to 602-3. Examples of useful informations indicated by each of the $1^{st}$ to $3^{rd}$ movable button pads 602-1 to 602-3 are shown in Table 1.

TABLE 1

| | |
|---|---|
| $1^{st}$ movable button pad 602-1 | Hardware key provided to an exterior case (a backward button, a home button, or a menu paging button) |
| | Software key provided to a touchscreen bottom end (a backward button, a home button, or a menu paging button) |
| $2^{nd}$ movable button pad 602-2 | Display function buttons used by a currently outputted application |
| | Displayed function buttons include the following. |
| | Setting icons (displayed if a $1^{st}$ movable button pad is touched) |
| | Internet tool bar/search icon (when a web browsing application is activated) |
| | Others, function buttons of the currently outputted application |
| | Home screen launcher icons, when a home screen is outputted |
| | Music/Video controller |
| | Function buttons in an incoming call screen, when a call signal is received |
| $3^{rd}$ movable button pad 602-3 | Display a latest one of alarms in one line |
| | Display setting icons on the $2^{nd}$ movable button pad if touched |

The $3^{rd}$ movable button pad 602-3 can display a most recently received alarm. For instance, the controller 180 can display an alarm of a most recently received text message on the $3^{rd}$ movable button pad 602-3. According to one embodiment of the present invention, if the controller 180 receives an input of selecting (or touching) the $3^{rd}$ movable button pad 602-3, it is proposed that the controller 180 outputs a setting screen to the $2^{nd}$ movable button pad 602-2 in response to the received input. As mentioned in the foregoing description, a command for applying a prescribed touch gesture to the status bar 503 is generally required for paging a setting screen. Since the status bar 503 is located on a most top end of the touchscreen 151 in general, it is not easy to page the setting screen while using one hand. Hence, according to one embodiment of the present invention, if the controller 180 receives an input of selecting the $3^{rd}$ movable button pad 602-3, it is proposed that the controller 180 outputs a setting screen to a location of the $2^{nd}$ movable button pad 602-2 [FIG. 15(b), FIG. 15(c)]. In particular, referring to FIG. 15(b), if the number of icons required for full settings is high, it may be difficult to display the entire icons within a region of the $2^{nd}$ movable button pad 602-2. In this case, in order to inform a user that the whole setting icons are not displayed, the controller 180 outputs an arrow indicator 1503 to indicate that the region of the $2^{nd}$ movable button pad 602-2 can be scrolled.

Hence, the setting icon(s) failing to be displayed within the $2^{nd}$ movable button pad 602-2 may be displayed by a scroll input applied to the $2^{nd}$ movable button pad 602-2 [FIG. 15(c)].

After the settings of the setting icons have been complete, if a prescribed time expires without receiving any inputs, the controller 180 can return to the display of the $2^{nd}$ movable button pad 602-2.

Meanwhile, according to one embodiment of the present invention, it is proposed that the buttons displayed on the $2^{nd}$ movable button pad 602-2 are adaptively changed depending on an output screen currently outputted from a background touchscreen 151. Such an embodiment shall be described with reference to FIG. 16 as follows.

Figure 16:
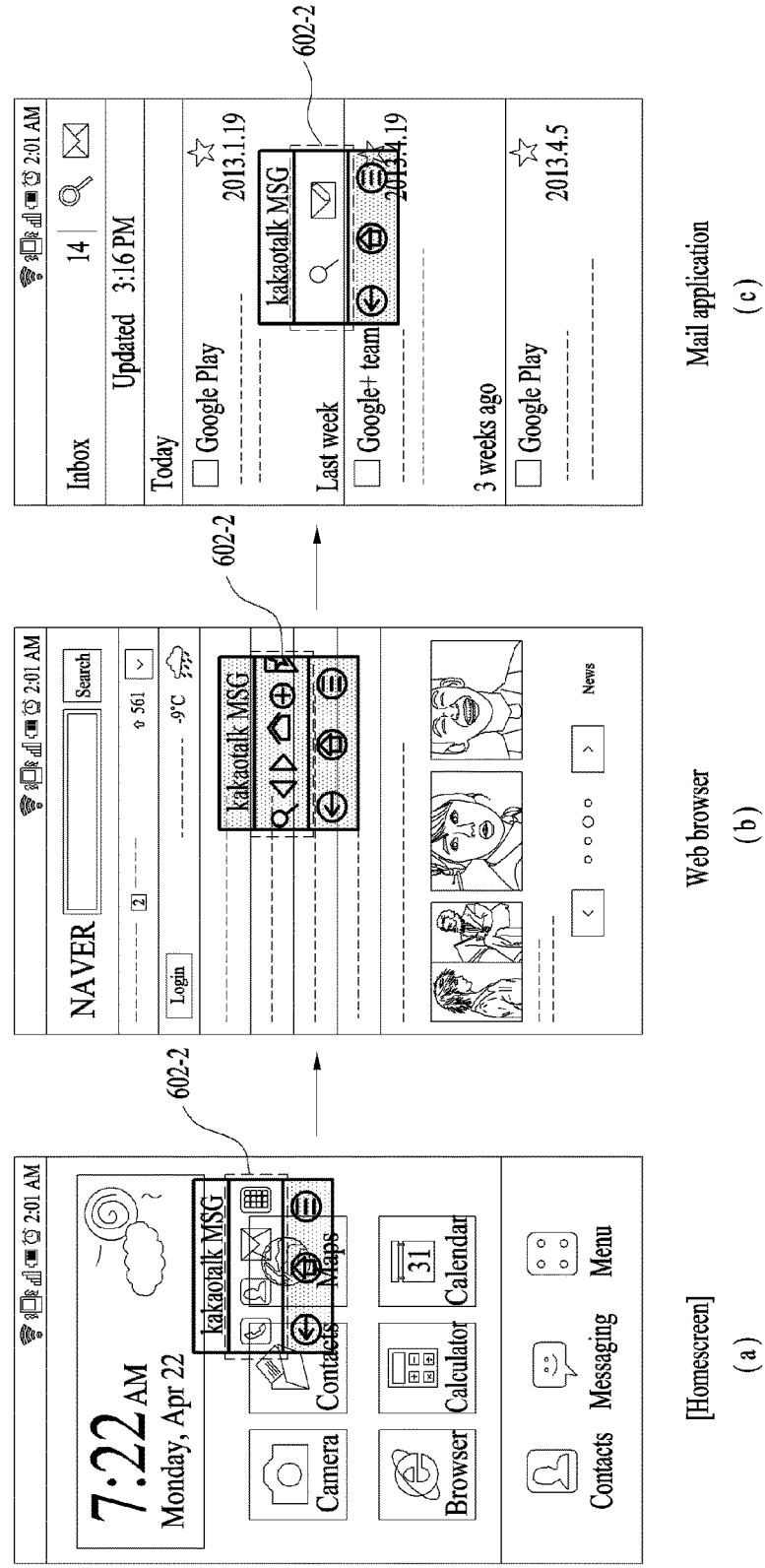
FIG. 16 is a diagram for one example of a method of changing a button outputted from a movable button pad 602 according to one embodiment of the present invention.

FIG. 16 is a diagram for one example of a method of changing a button outputted from a movable button pad 602 according to one embodiment of the present invention.

In FIG. 16(a), FIG. 16(b) and FIG. 16(c), the controller 180 currently outputs a home screen, a web browsing screen and an email application screen through the touchscreen 151, respectively. In doing so, it is proposed that the $2^{nd}$ movable button pad 602-2 can output buttons suitable for the corresponding output screens, respectively.

Referring to FIG. 16(a), in response to outputting a home screen to a background touchscreen 151, the controller 180 currently outputs home screen launcher icons to the $2^{nd}$ movable button pad 602-2. In this case, the home screen launcher icons may mean the icons displayed by being fixed to a bottom end of the touchscreen 151 all the time despite that a plurality of pages configuring a home screen are switched to be displayed. In particular, since the home screen launcher icons are displayed on the bottom end of the touchscreen 151, if the touchscreen 151 gets wider, it may be difficult to select the home screen launcher icons. Hence, according to one embodiment of the present invention, the home screen launcher icons can be displayed on the movable button pad 602.

Referring to FIG. 16(b), in response to outputting a screen of a web browsing application to a background touchscreen 151, the controller 180 currently outputs function buttons of the web browsing application to the $2^{nd}$ movable button pad 602-2. In this case, the function buttons of the web browsing application are the buttons for assisting a web browsing function and may include a backward button, a refresh button, a search button and the like. Since these buttons are generally located at a most top or bottom end of an output screen of the web browsing application, it gets more difficult to select the buttons if a size of the touchscreen 151 gets wider.

Referring to FIG. 16(c), in response to outputting a screen of an email application to a background touchscreen 151, the controller 180 currently outputs function buttons of the email application to the $2^{nd}$ movable button pad 602-2. In this case, the function buttons of the email application are the buttons for assisting an email function and may include a new mail compose button, a refresh button, a search button and the like. Since these buttons are generally located at a most top or bottom end of an output screen of the email application, it gets more difficult to select the buttons if a size of the touchscreen 151 gets wider.

Meanwhile, in the above-described embodiments, the $1^{st}$ to $3^{rd}$ movable button pads 602-1 to 602-3 are shifted or moved in a manner of being grouped. Yet, the $1^{st}$ to $3^{rd}$ movable button pads 602-1 to 602-3 may be outputted and/or shifted individually. Such an example shall be described in detail with reference to FIG. 17 as follows.

Figure 17:
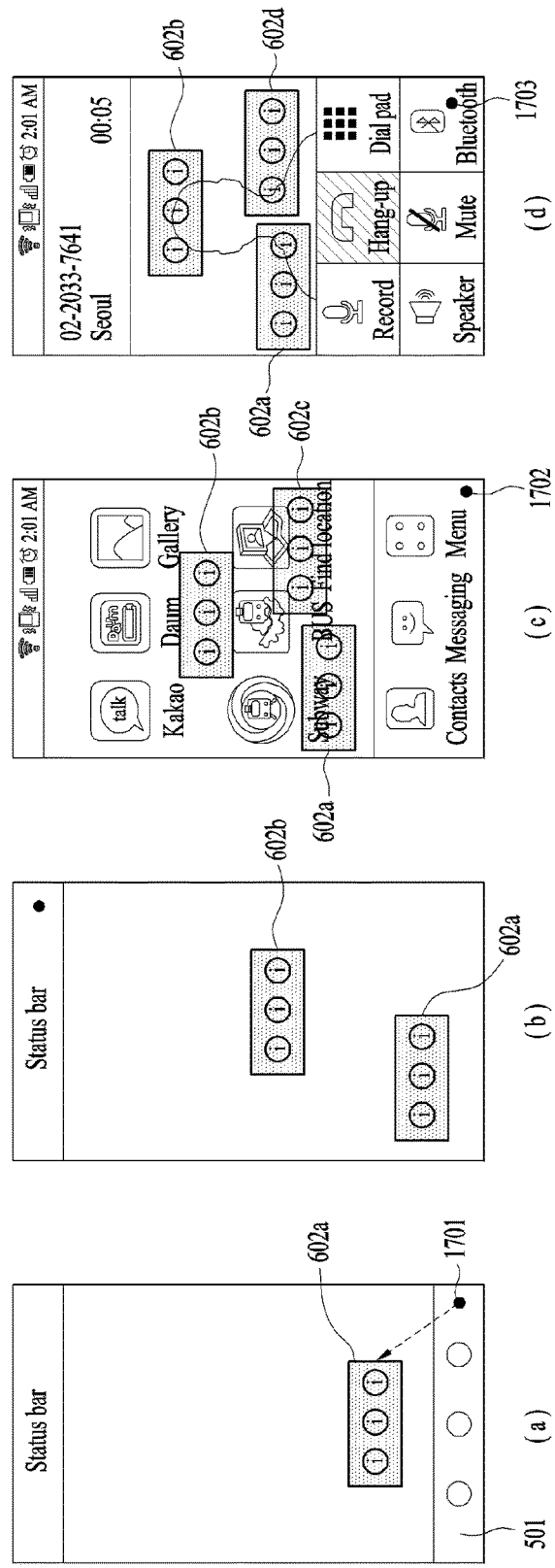
FIG. 17 is a diagram for a case of outputting and moving movable button pads individually according to one embodiment of the present invention.

FIG. 17 is a diagram for a case of outputting and moving movable button pads individually according to one embodiment of the present invention.

Referring to FIG. 17(a), in response to an input 1701 of selecting a $1^{st}$ activation icon, the controller 180 can output a $1^{st}$ independent movable button pad 602a.

Referring to FIG. 17(b), if a $2^{nd}$ activation icon is selected, the controller 180 can output a $2^{nd}$ independent movable button pad 602b.

Referring to FIG. 17(c), if a $3^{rd}$ activation icon outputted from a home screen is selected [1702], the controller 180 can output a $3^{rd}$ independent movable button pad 602c. Meanwhile, according to one embodiment of the present invention, it is proposed that the $3^{rd}$ independent movable button pad 602c is displayed on the home screen only. The reason for this is explained as follows. First of all, since the $3^{rd}$ independent movable button pad 602c displays function buttons (e.g., launcher icons) used on the home screen, if a current screen is switched to an active screen of another application, it is preferable that function buttons of the corresponding application are displayed.

Referring to FIG. 17(d), if the controller 180 receives an input 17803 of selecting a $4^{th}$ activation icon outputted to an incoming call screen, the controller 180 can display a $4^{th}$ independent movable button pad 602d. Likewise, since the $4^{th}$ independent movable button pad 602d displays function buttons for the incoming call screen, if a current screen is switched to an active screen of another screen (or a home screen) on the background touchscreen 151, the $4^{th}$ independent movable button pad 602d may not be displayed by being automatically disabled.

Setting Screen of $1^{st}$ Button Region 501

Figure 18:
FIGS. 18 to 20 are diagrams for one example of a setting method for editing function buttons included in a $1^{st}$ button region 501 according to one embodiment of the present invention.
Figure 19:
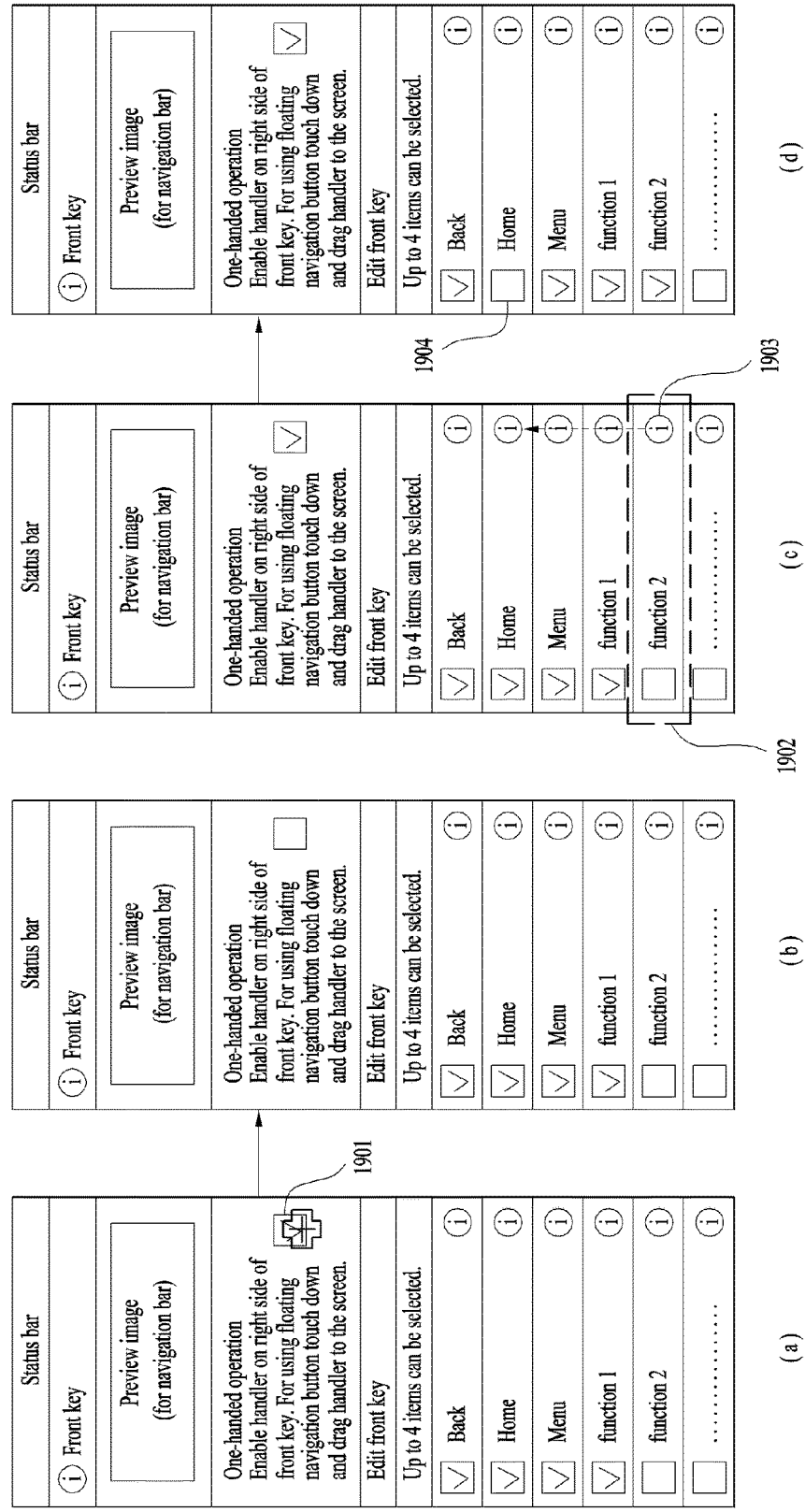
Figure 20:
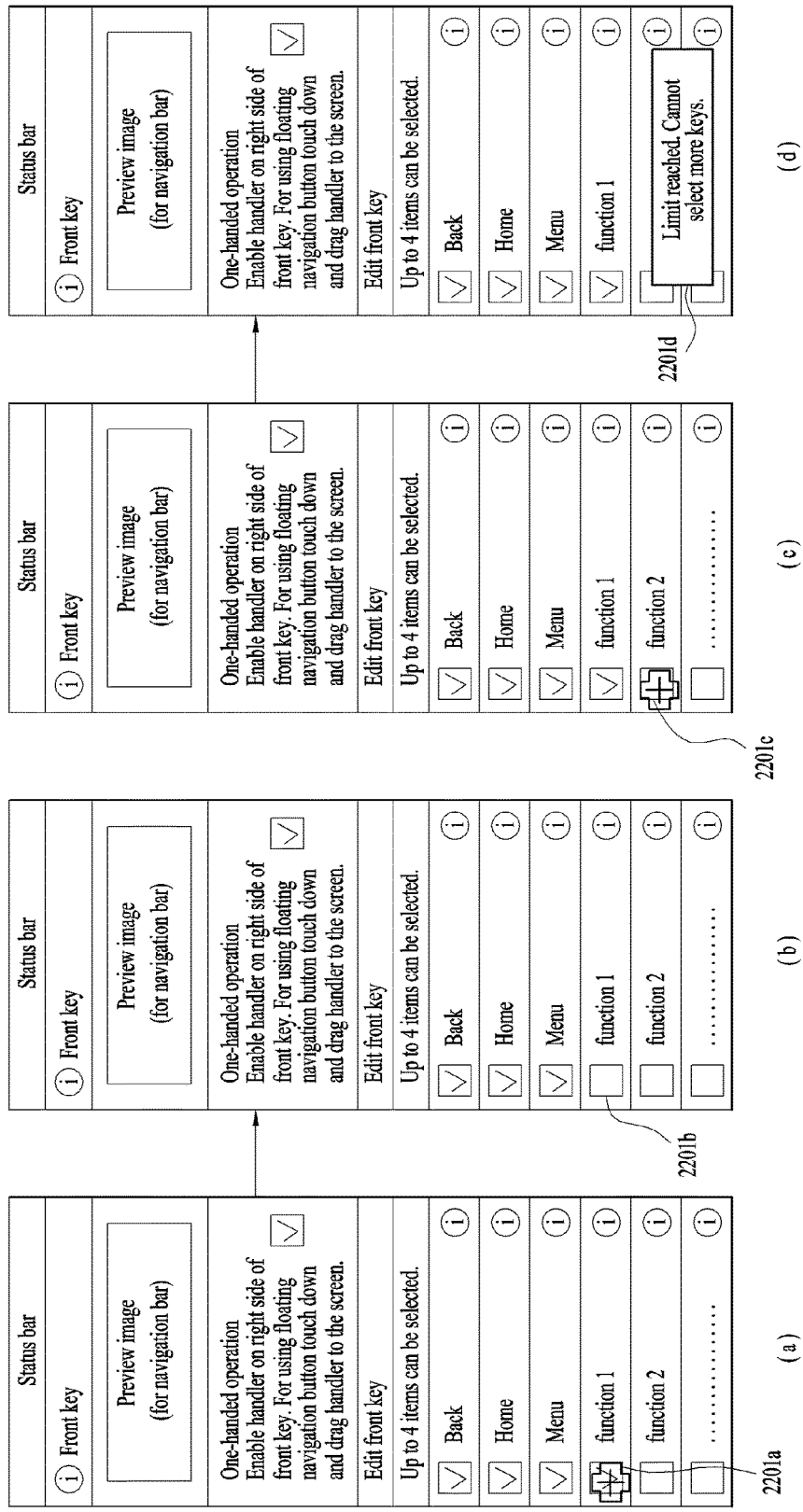

FIGS. 18 to 20 are diagrams for one example of a setting method for editing function buttons included in the $1^{st}$ button region 501 according to one embodiment of the present invention. As mentioned in the foregoing description with reference to FIG. 5, like the example of the function buttons inclusive in the $1^{st}$ button region 501, at least one of the backward (return) button 501-1, the home button 501-2 and the menu list paging button 501-3 can be included. Moreover, other buttons can be added in addition or replace the existing buttons.

Referring to FIG. 18(a), a plurality of setting lists are currently outputted. If an item 'front key' is selected from the setting list, referring to FIG. 18(b), a detailed setting screen for the $1^{st}$ button region 501 can be outputted.

On the setting screen show in FIG. 18(b), check boxes 1804 to 1807 for the corresponding items can be displayed together with a list of a plurality of buttons. The controller 180 can control the buttons having the check boxes 1804 to 1807 checked in this setting screen to be outputted to the $1^{st}$ button region 501. The controller 180 can provide a region 1802 for displaying a preview of the $1^{st}$ button region 501 configured with additionally checked buttons. Moreover, in the setting screen shown in FIG. 18(b), according to one embodiment of the present invention, it is able to further output an enablement check box 1803 for selecting whether to enable functions for assisting one-handed manipulation (or operation), which is described in detail with reference to FIG. 19(a) and FIG. 19(b).

Referring to FIG. 19(a) and FIG. 19(b), if an input of unchecking the enablement check box 1803 is received, a function of the movable button pad 602 according to one embodiment of the present invention may not operate. Hence, the controller 180 may not output the icons 601-1 to 601-3 for enabling the movable button pad 602.

FIG. 19(a) and FIG. 19(b) show a method of changing order of the buttons on the list outputted from the setting screen. Assume a situation that a user intends to draw up a button of an item 1902. The controller 180 separately outputs an order change icon 1903 for each item. If the controller 180 receives an input of selecting the corresponding order change icon 1903, the controller 180 can change the order for the corresponding item. For instance, if an input of touching the order change icon 1903 is received, a drag input can be performed on a desired location while the touch is maintained [FIG. 19(c), FIG. 19(d)].

FIG. 20(a) shows a case that a selection of a check box for a prescribed button item is cancelled. If the selection of the check box for the prescribed button item is cancelled, the controller 180 can control a corresponding selection-cancelled button not to be displayed on the $1^{st}$ button region 501. FIG. 20(b) shows the selection-cancelled check box 2001b.

Meanwhile, according to one embodiment of the present invention, the maximum number of buttons outputtable from the $1^{st}$ button region 501 is assumed as set to 4. If the controller 180 receives an input 2001c that makes the number of the selected button items exceed the maximum number '4', the controller 180 180 outputs a popup window 2001d indicating that the maximum number is exceeded and is able to set a last selected check box not to be selected [FIG. 20(c), FIG. 20(d)].

Figure 21:
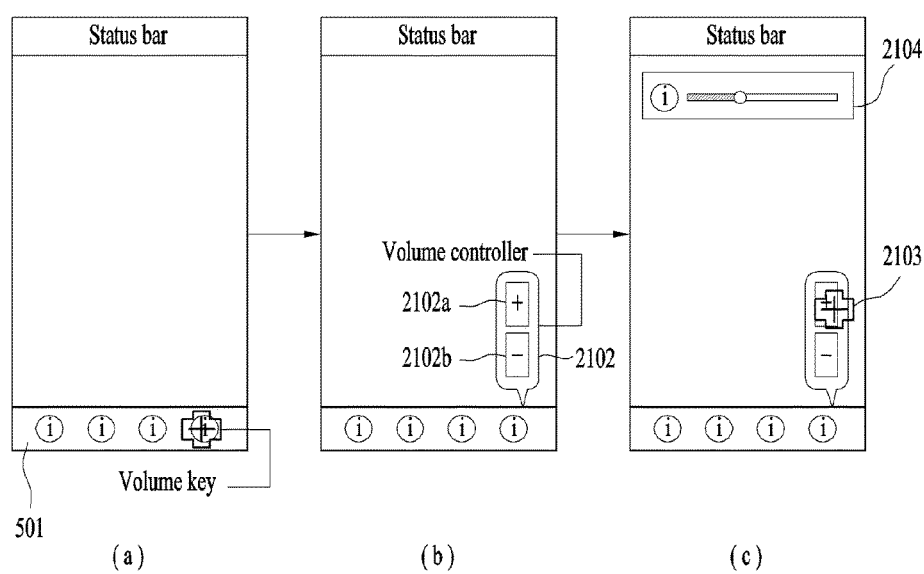
FIG. 21 and FIG. 22 are diagrams for examples of a case of selecting a volume setting button 2101 according to one embodiment of the present invention.
Figure 22:
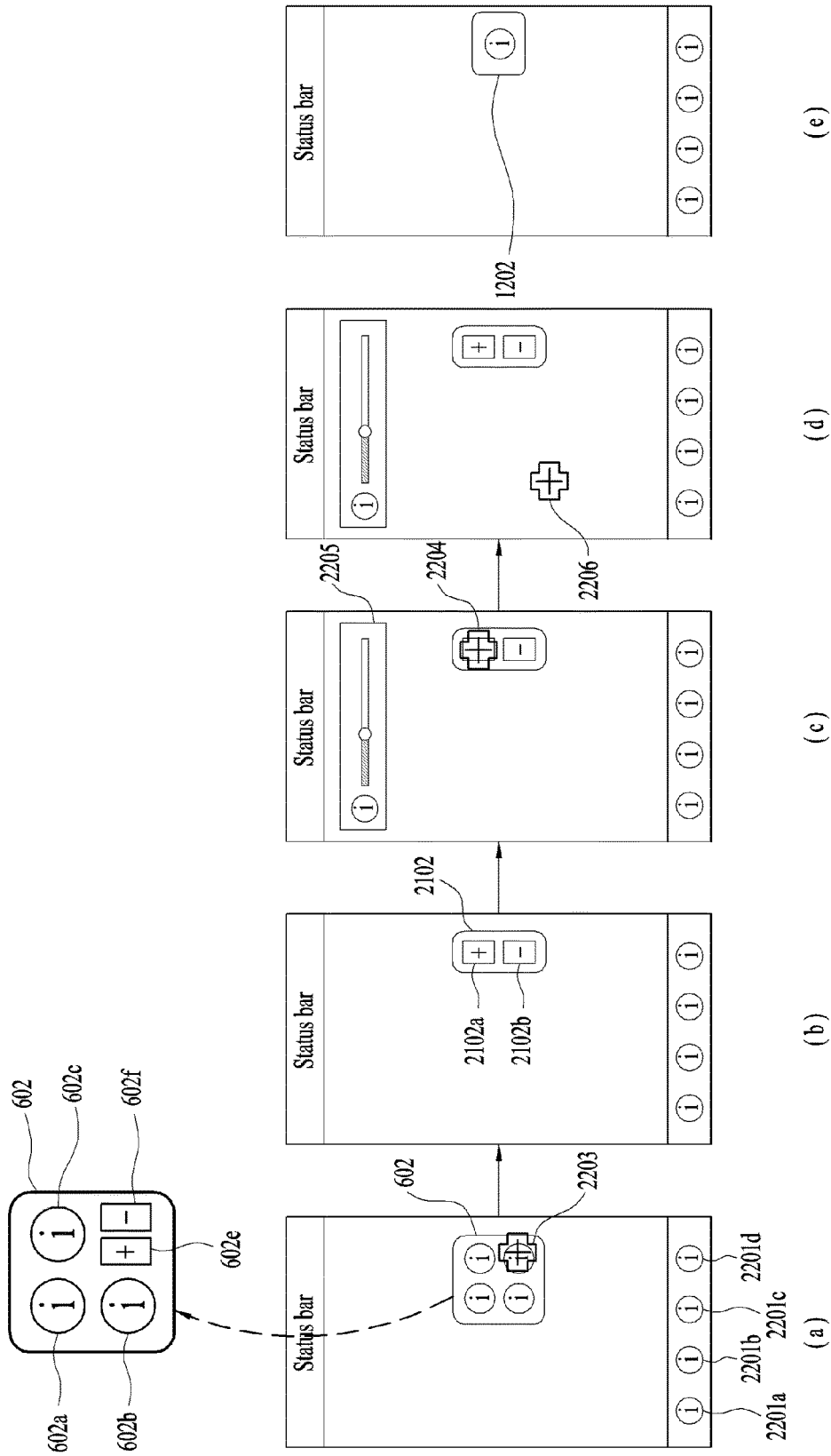

In the embodiments shown in FIG. 21 and FIG. 22, described is a case that a volume setting button 2101 is selected in addition to the backward (return) button 501-1, the home button 501-2 and the menu list paging button 501-3 in the setting screen.

FIG. 21 and FIG. 22 are diagrams for examples of a case of selecting a volume setting button 2101 according to one embodiment of the present invention.

Referring to FIG. 21(a), a volume setting button 2101 is currently outputted from the 1$^{st}$ button region 501.

Referring to FIG. 21(b), if the controller 180 receives an input of selecting the volume setting button 2101, the controller 180 can output a popup window 2102 for controlling a volume. In the popup window 2102 for controlling the volume, a volume-up button 2102a and a volume-down button 2102b can be included. If each of the buttons 2102a and 2102b is selected, the controller 180 can increase or decrease the volume.

Referring to FIG. 21(c), the volume-up button 2102a is selected. If the volume-up button 2102a is selected, the controller 180 increases a system volume and is also able to output a popup window 2104 indicating a current volume state.

Referring to FIG. 22(a), a volume setting button 2201d is included in the 1$^{st}$ button region 501 together with buttons 201a to 2201c. And, buttons corresponding to the 1$^{st}$ button region 501 are outputted from a movable button pad 602 corresponding to the 1$^{st}$ button region 501.

Referring to FIG. 22(b), if the controller 180 receives an input 2203 of selecting the volume setting button 2201, the controller 180 can output a popup window 2102 for controlling a volume. In the popup window 2102 for controlling the volume, a volume-up button 2102a and a volume-down button 2102b can be included. If each of the buttons 2102a and 2102b is selected, the controller 180 can increase or decrease the volume.

Referring to FIG. 22(c), if the controller 180 receives an input 2204 of selecting the volume-up button 2102a, the controller 180 increases a system volume and is also able to output a popup window 2205 indicating a current volume state.

While the popup window 2102 for controlling the volume is outputted, if the controller 180 receives an input 2206 of selecting another region except the popup window 2102 for controlling the volume, the controller 180 minimizes the popup window 2102 for controlling the volume and is able to display a reduced icon 1202.

Meanwhile, according to the former embodiment, the popup window 2102 for controlling the volume is separately outputted. Yet, according to another example of the present invention, a volume-up button 602e and a volume-down button 602f can be outputted from the movable button pad 602 in itself [cf. an enlarged pad 602 shown in an upper part of the drawing shown in FIG. 22(a)].

Figure 23:
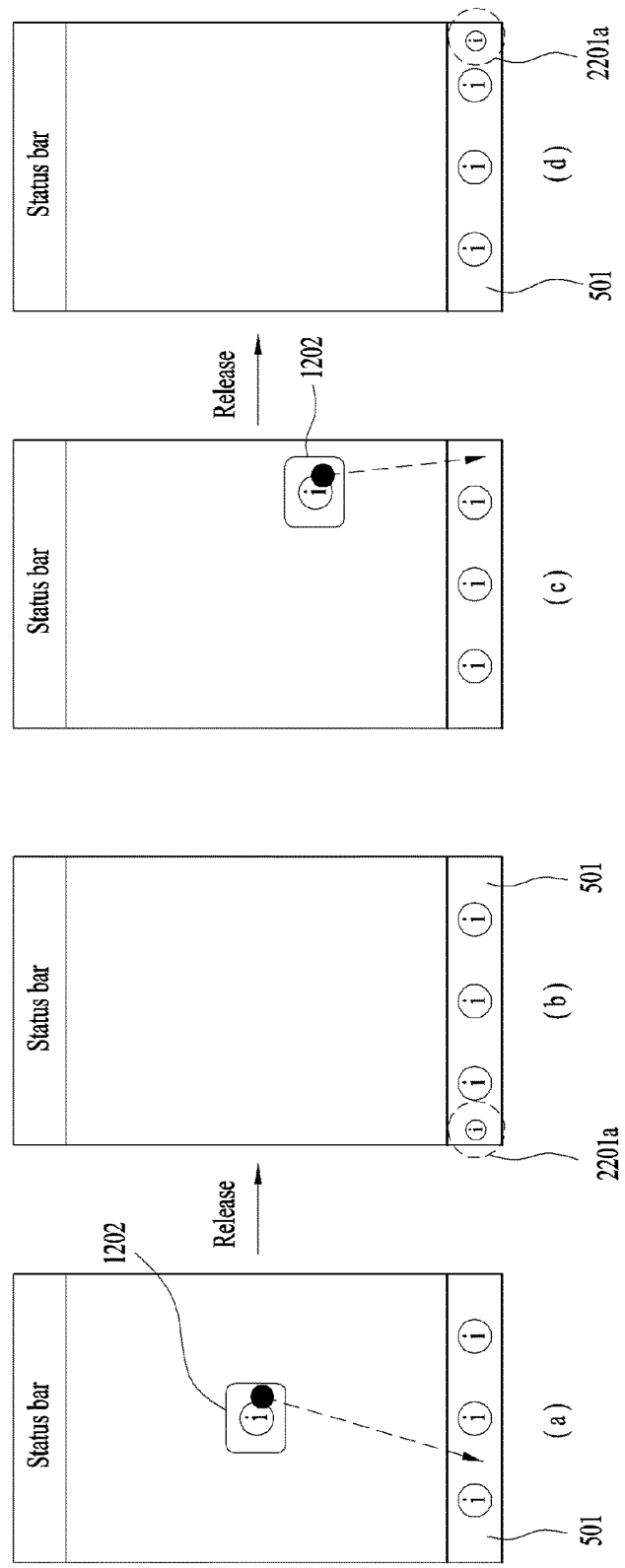
FIG. 23 is a diagram for one example of a case that a location of a displayed activation button is changeable in response to a command for disabling a reduced icon 1202 according to one embodiment of the present invention.

FIG. 23 is a diagram for one example of a case that a location of a displayed activation button is changeable in response to a command for disabling a reduced icon 1202 according to one embodiment of the present invention.

Referring to FIG. 23(a), a reduced icon 1202 is currently outputted from the touchscreen 151. If the controller 180 receives a command for disabling the reduced icon 1202, the controller 180 may stop displaying the reduced icon 1202 on the touchscreen 151. In doing so, the disabling command may include an input applied in a manner of receiving a touch input to the reduced icon 1202 and then dragging it to the 1$^{st}$ button region 501 by maintaining the touch input.

According to one embodiment of the present invention, it is proposed to determine a location, at which an activation icon will be displayed, in a manner of partitioning the 1$^{st}$ button region 501 into a left region and a right region and then determining which one of the left region and the right region is a final location of a drag.

In particular, if a final drag location for the command for disabling the reduced icon 1202 is the left region of the 1$^{st}$ button region 501 [FIG. 23(a)], the controller 180 can display the activation icon 2201a on the left region of the 1$^{st}$ button region 501 [FIG. 23(b)].

In particular, if a final drag location for the command for disabling the reduced icon 1202 is the right region of the 1$^{st}$ button region 501 [FIG. 23(c)], the controller 180 can display the activation icon 2201a on the right region of the 1$^{st}$ button region 501 [FIG. 23(d)].

Figure 24:
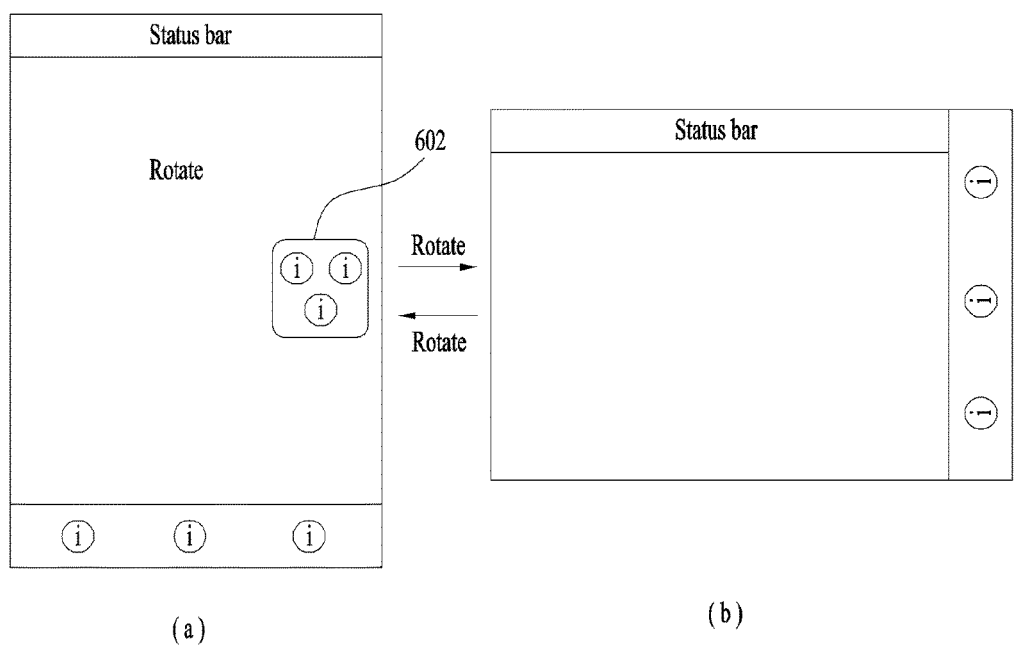
FIG. 24 is a diagram for one example of displaying a movable button pad 602 in response to a rotation action of a mobile terminal 100 according to one embodiment of the present invention.

FIG. 24 is a diagram for one example of displaying a movable button pad 602 in response to a rotation action of a mobile terminal 100 according to one embodiment of the present invention.

According to one embodiment of the present invention, while the movable button pad 602 is displayed, if the mobile terminal 100 is rotated to switch its mode from a portrait mode to a landscape mode, it is proposed that the controller 180 stops displaying the currently displayed movable button pad 602 [FIG. 24(a), FIG. 24(b)]. The reason for this is described as follows. First of all, a user generally uses both hands in the landscape mode. Secondly, if a user uses both hands, a touch-impossible region or a touch-inconvenient region barely exists. Thirdly, since the landscape mode is mostly entered to watch a video or photo, if an obstacle exists in the photo or video, it may cause inconvenience to a user.

Figure 25:
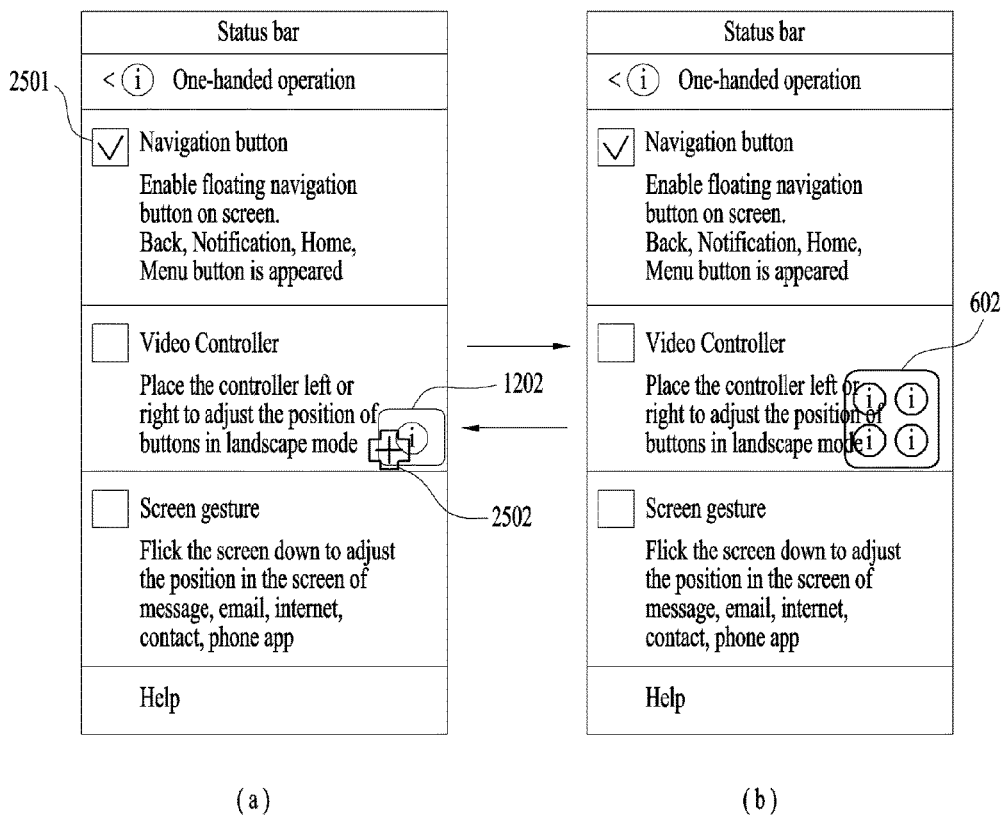
FIG. 25 is a diagram of a setting screen for setting a movable button pad 602 according to one embodiment of the present invention.

FIG. 25 is a diagram of a setting screen for setting a movable button pad 602 according to one embodiment of the present invention.

Referring to FIG. 25(a), the controller 180 can output a check box 2502 for setting the movable button pad 602 (navigation button). If the controller 180 receives an input of selecting the check box 2501, the controller 180 can output the movable button pad 602 (or a reduced icon 1202 of the movable button pad 602). In doing so, the movable button pad 602 or the reduced icon 1202 can be configured semi-transparently.

Referring to FIG. 25(b), if the controller 180 receives an input of selecting the reduced icon 1202, the controller 180 can output the movable button pad 602 instead of outputting the reduced icon 1202.

Meanwhile, according to one embodiment of the present invention, it is proposed that the controller 180 displays a reduced icon 1202 in a manner of changing a location of the reduced icon 1202 depending on a status of a screen currently outputted from the touchscreen 151. In particular, the controller 180 is proposed to output the reduced icon 1202 in a manner of automatically adjusting a location of the reduced icon 1202.

Figure 26:
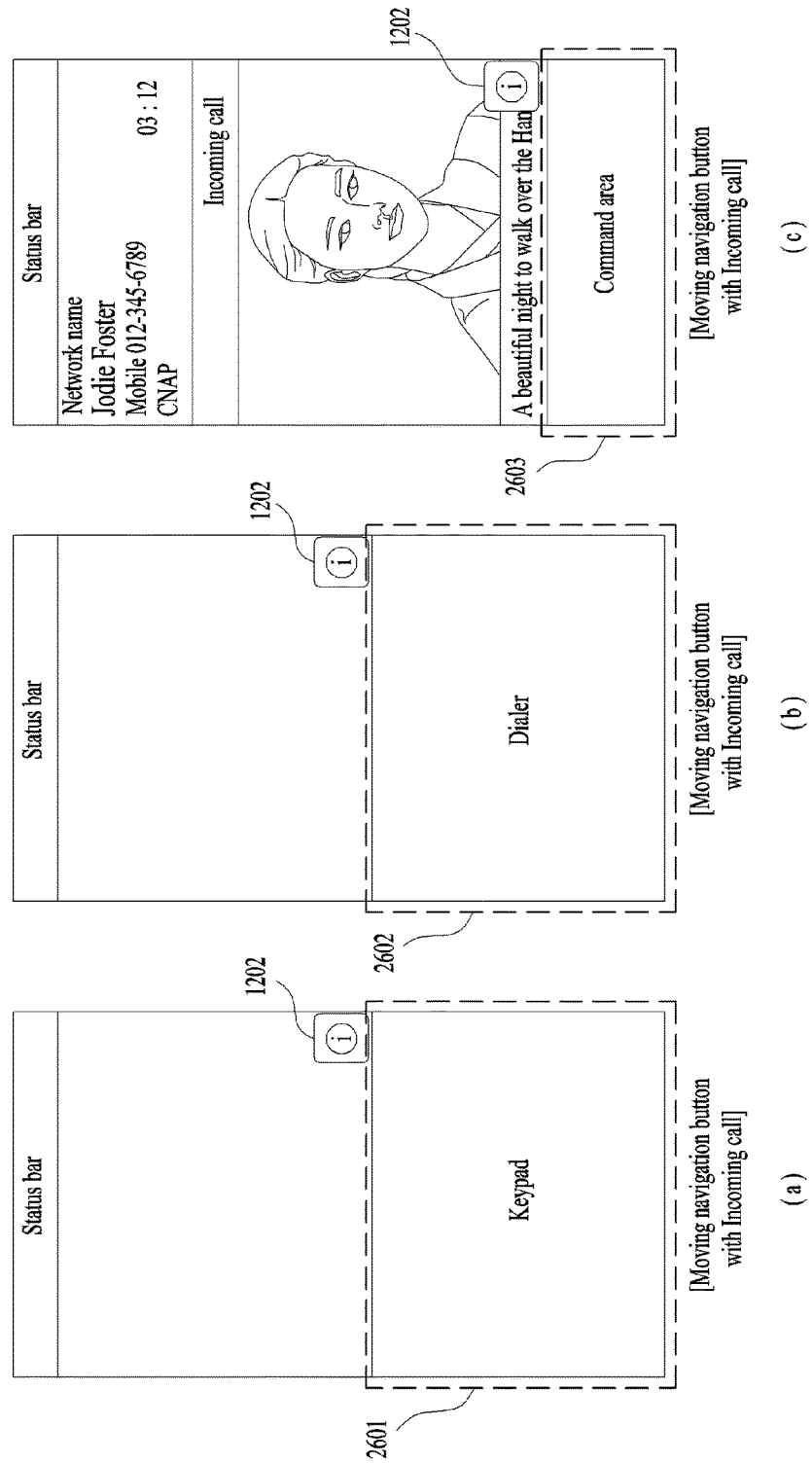
FIG. 26 is a diagram for one example of adaptively changing a location of a reduced icon 1202 according to one embodiment of the present invention.

FIG. 26 is a diagram for one example of adaptively changing a location of a reduced icon 1202 according to one embodiment of the present invention.

Referring to FIG. 26(a), a keypad 2601 is currently outputted from a prescribed region of the touchscreen 151. While a reduced icon 1202 is displayed, if the controller 180 outputs the keypad 2601, it is proposed that the reduced icon 1202 is displayed at a location that does not overlay a region of the outputted keypad 2601. The reason for this is that many touches are expected to be inputted to the region of the keypad 2601 by a user. For instance, if the region of outputting the keypad 2601 and the region of outputting the reduced icon 1202 overlay each other, as shown in FIG. 26(*a*), the controller 180 can change a location of the reduced icon 1202 such that the reduced icon 1202 is displayed by being situated close to an outside of a top corner of the keypad 2601.

Referring to FIG. 26(*b*), a phone number dialer 2602 is currently outputted from a prescribed region of the touchscreen 151. While a reduced icon 1202 is displayed, if the controller 180 outputs the phone number dialer 2602, it is proposed that the reduced icon 1202 is displayed at a location that does not overlay a region of the outputted phone number dialer 2602. For instance, if the region of outputting the phone number dialer 2602 and the region of outputting the reduced icon 1202 overlay each other, as shown in FIG. 26 (*b*), the controller 180 can change a location of the reduced icon 1202 such that the reduced icon 1202 is displayed by being situated close to an outside of a top corner of the phone number dialer 26021.

Referring to FIG. 26(*c*), the mobile terminal 100 currently receives a call signal. And, the controller 180 currently outputs an incoming call screen for the received call signal to the touchscreen 151. Moreover, the controller 180 currently displays function buttons 2603 (command area) for controlling a call reception on a prescribed region of the touchscreen 151. While a reduced icon 1202 is displayed, if the controller 180 outputs the function buttons 2603 for controlling the phone reception, it is proposed that the reduced icon 1202 is displayed at a location that does not overlay a region of the outputted function buttons 2603. For instance, if the region of outputting the function buttons 2603 and the region of outputting the reduced icon 1202 overlay each other, as shown in FIG. 26(*c*), the controller 180 can change a location of the reduced icon 1202 such that the reduced icon 1202 is displayed by being situated close to an outside of a top corner of the function buttons 2603.

According to the embodiment described with reference to FIG. 26, the output of the reduced icon 1202 is taken as one example. And, it is apparent to those skilled in the art that the embodiment described with reference to FIG. 26 is identically applicable to an output of the movable button pad 602.

FIGS. 27 to 31 are diagrams for one example of automatically/manually adjusting a location of a reduced icon 1202, if a movable button pad 602 is minimized, according to one embodiment of the present invention.

Figure 27:
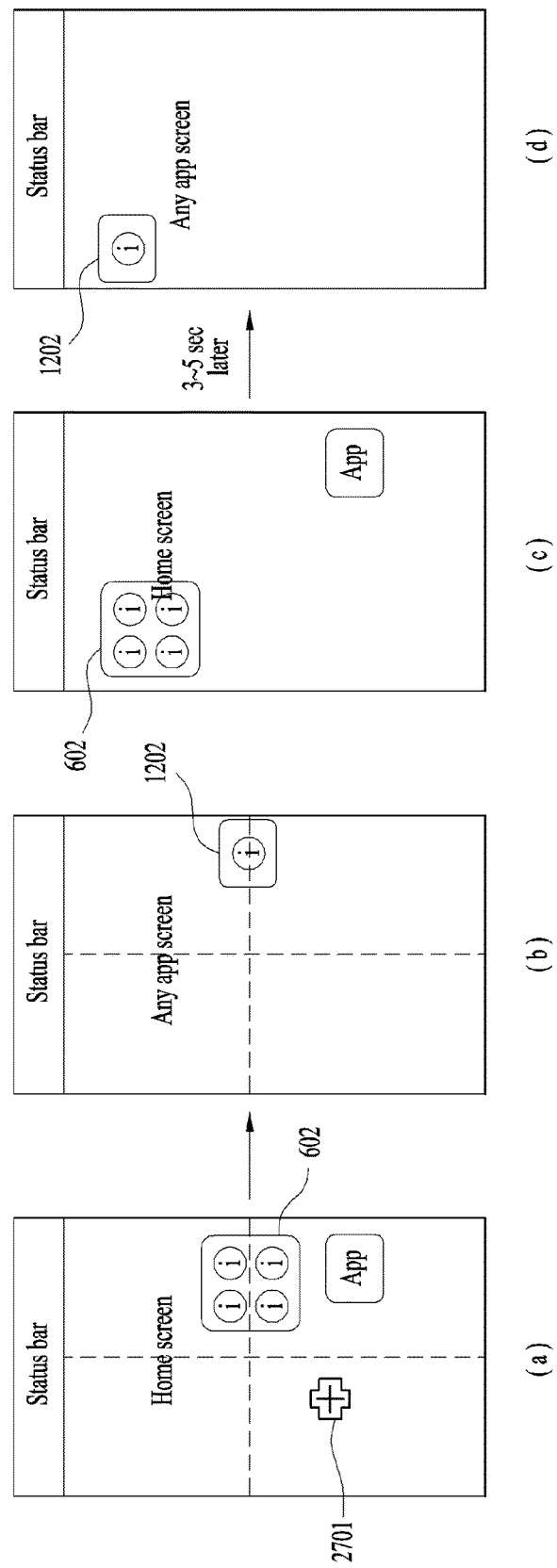
FIGS. 27 to 31 are diagrams for one example of automatically/manually adjusting a location of a reduced icon 1202, if a movable button pad 602 is minimized, according to one embodiment of the present invention.

Referring to FIG. 27(*a*), the controller 180 currently outputs a movable button pad 602 according to one embodiment of the present invention. In doing so, if the controller 180 receives an input (e.g., a touch input) of selecting a region other than a region of the movable button pad 602, the controller 180 replaces the movable button pad 602 by a reduced icon 1202, which results from minimizing the movable button pad 602, and then outputs the reduced icon 1202. In doing so, the controller 180 can control a location of the reduced icon 1202, which is outputted to replace the movable button pad 602, to adhere to a corner closest to the previously outputted movable button pad 602 [FIG. 27(*b*)].

Referring to FIG. 27(*c*), the controller 180 currently outputs a movable button pad 602 according to one embodiment of the present invention. In doing so, if the controller 180 does not receive any inputs to the movable button pad 602 over a prescribed time, the controller 180 can output a reduced icon 1202 instead of the movable button pad 602 [FIG. 27(*d*)]. Regarding a location for outputting the reduced icon 1202, the controller 180 can control a location of the reduced icon 1202 to adhere to a corner closest to the previously outputted movable button pad 602 [FIG. 27(*d*)].

Figure 28:
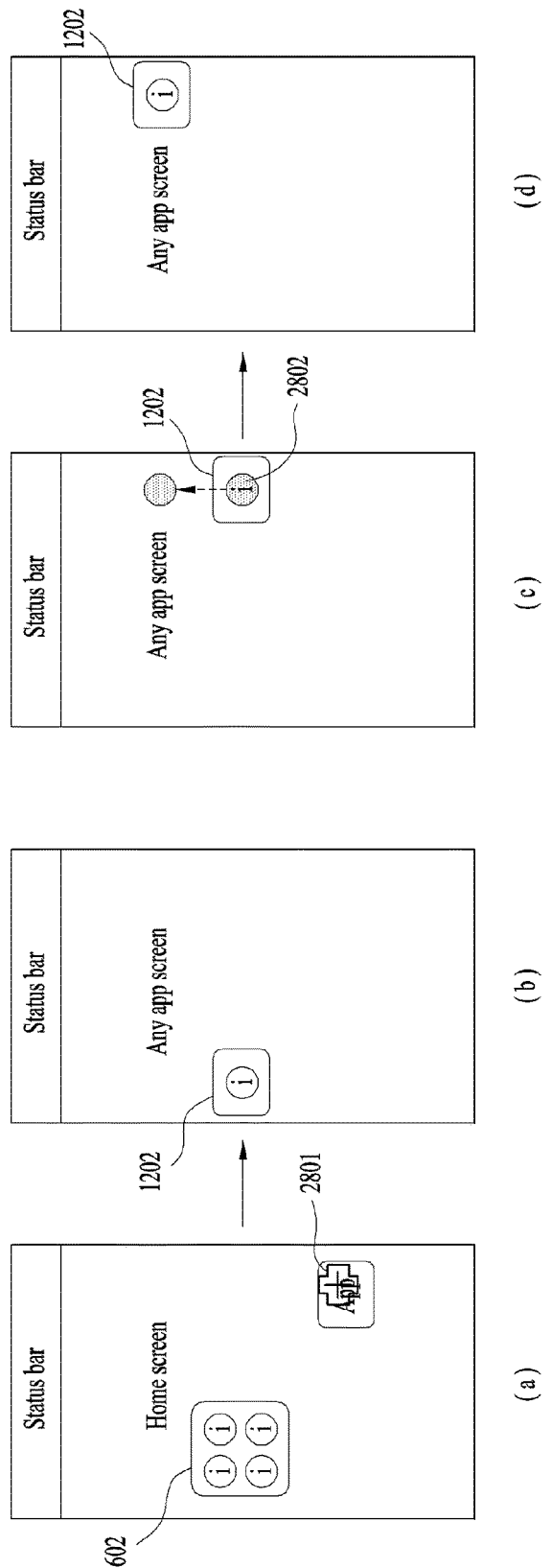

Referring to FIG. 28(*a*), the controller 180 currently outputs a movable button pad 602 according to one embodiment of the present invention. In doing so, if an activation icon of a prescribed application is selected [2801], the controller 180 outputs an active screen of the corresponding application in response to the selection 2801 and is also able to output a reduced icon 1202 replacing the movable button pad 602 to minimize. Regarding a location for outputting the reduced icon 1202, the controller 180 can control a location of the reduced icon 1202 to adhere to a corner closest to a location of the previously outputted movable button pad 602 [FIG. 28(*b*)].

FIG. 28(*c*) and FIG. 28(*d*) are diagrams for one example of a method of shifting a location of the reduced icon 1202. If the controller 180 receives an input 2802 of shifting a location of the reduced icon 1202 [FIG. 28(*c*)], the controller 180 can output the reduced icon 1202 in a manner of shifting the location of the reduced icon 1202 [FIG. 28 (*d*)]. In doing so, as one example of the input 2802 of shifting the location, there may be an input applied in a manner of touching the reduced icon 1202 and then dragging it to a desired location by maintaining the touch.

Figure 29:
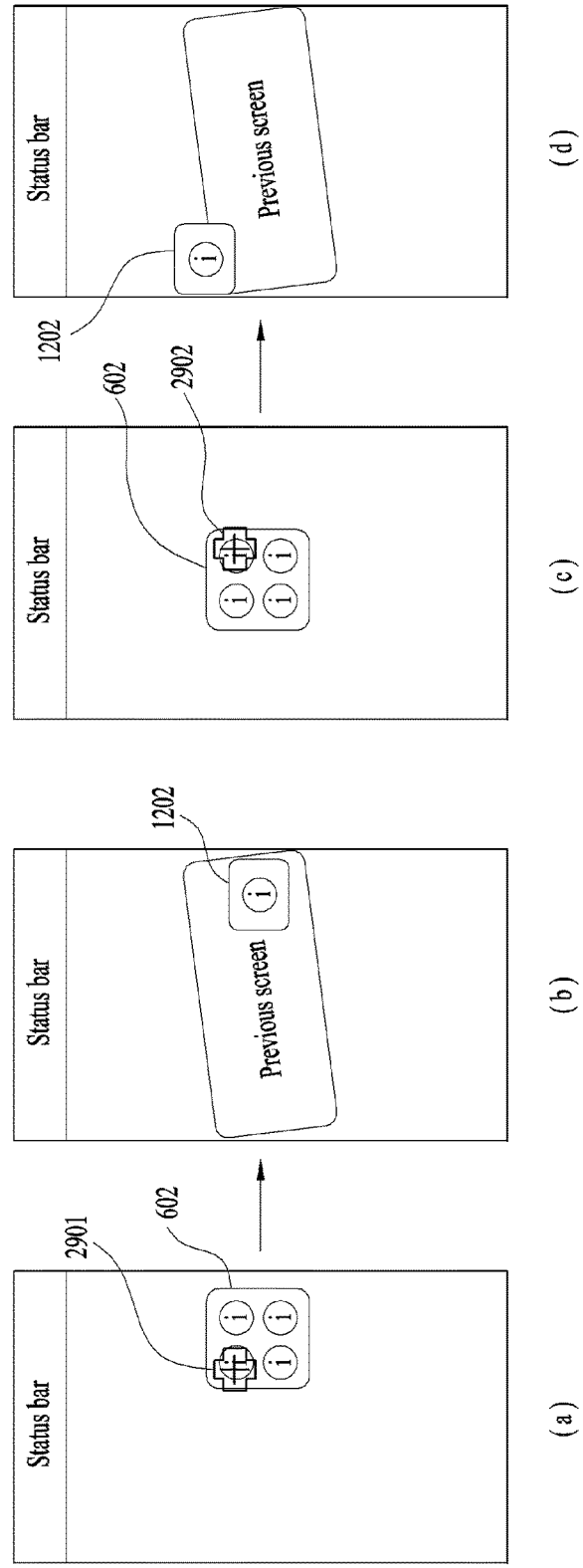

Referring to FIG. 29(*a*) and FIG. 29(*b*), the controller 180 currently outputs a movable button pad 602 to the touchscreen 151. If the controller 180 receives an input 2901 of selecting the backward button 501-1, the controller 180 returns to a previously outputted screen and is also able to output a reduced icon 1202 resulting from minimizing the movable button pad 602.

Referring to FIG. 29(*c*) and FIG. 29(*d*), the controller 180 currently outputs a movable button pad 602 to the touchscreen 151. If the controller 180 receives an input 2901 of selecting the home screen button 501-2, the controller 180 outputs a home screen and is also able to output a reduced icon 1202 resulting from minimizing the movable button pad 602.

Figure 30:
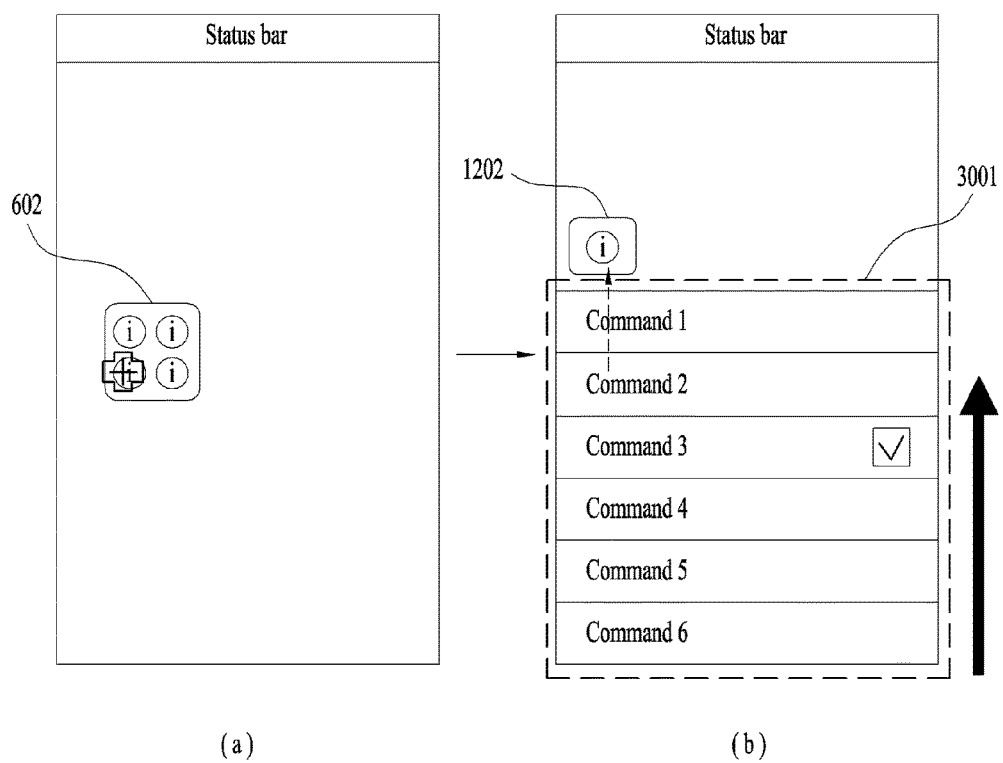

FIG. 30 is a diagram to describe a method of outputting a reduced icon 1202 in response to a menu list paging by changing a location of the reduced icon 1202.

Referring to FIG. 30(*a*), the controller 180 currently outputs a movable button pad 602 to the touchscreen 151. In doing so, if the controller 180 receives a menu list paging command, the controller 180 can output a menu list 3001. And, the controller 180 can output a reduced icon 1202 in a manner of changing a location of the reduced icon 1202 in order for the reduced icon 1202 not to overlay a region of outputting the menu list 3001. For instance, the controller 180 can output the reduced icon 1202 in a manner that a location of the reduced icon 1202 adheres to an outside of a top corner of the menu list 3001 appearing in a manner of being outputted from a bottom of the touchscreen 151 [FIG. 30(*b*)].

Figure 31:
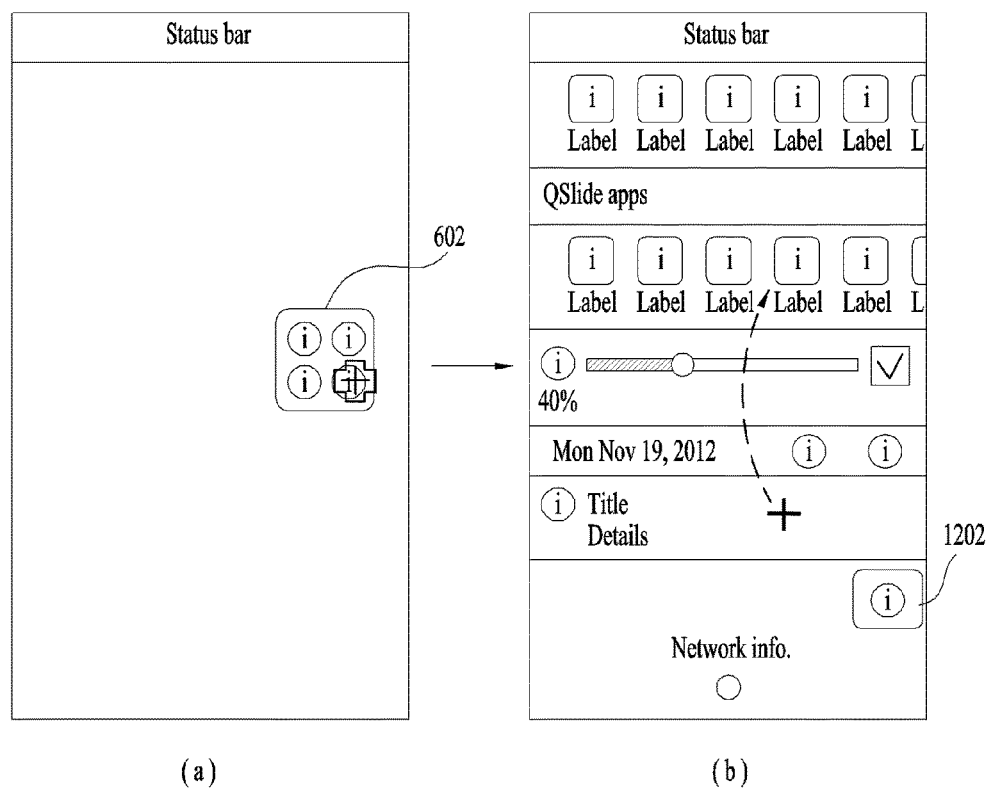

FIG. 31 is a diagram to describe a method of outputting a reduced icon 1202 in response to an output of a setting menu window by changing a location of the reduced icon 1202.

Referring to FIG. 31(*a*), the controller 180 currently outputs a movable button pad 602 to the touchscreen 151. In doing so, if the controller 180 receives a setting menu paging command, the controller 180 can output a setting menu window [FIG. 31(*b*)]. And, the controller 180 can output a reduced icon 1202 in a manner of changing a location of the reduced icon 1202 in order for the reduced icon 1202 not to overlay a region of outputting the setting menu window. For instance, the controller 180 can output the reduced icon 1202 in a manner that a location of the reduced icon 1202 adheres to an outside of a bottom corner of the setting menu window appearing in a manner of being outputted from a top of the touchscreen 151 [FIG. 31(*b*)].

Meanwhile, according to one embodiment of the present invention, it may happen that a movable button pad 602 contends with another function supported by the controller 180. Hence, according to one embodiment of the present invention, when a function of the movable button pad 602 is activated (or enabled), if it is determined that the activated function contends with another function, it is proposed that the function of the movable button pad 602 is automatically deactivated (or disabled).

FIG. 32 is a diagram for one example of a method of automatically disabling a function of a movable button pad 602 according to one embodiment of the present invention.

Referring to FIG. 32(*a*), a setting screen for enabling a function of an assistive touch 3201 is displayed. The controller 180 can output an icon for enabling the assistive touch function to the setting screen.

In this case, the assistive touch function means the function for replacing a touch input by the same input of a hardware button, a touch gesture or one of assistive inputs through various sensors. In case that the assistive touch function is used together with the movable button pad 602 according to one embodiment of the present invention, since the assistive touch function occupies a considerable area of the touchscreen 151, it may become in appropriate. Therefore, according to one embodiment of the present invention, if the assistive touch function is enabled, the controller 180 automatically disables a currently enabled function of the movable button pad 602. In the corresponding disabling process, the controller 180 outputs a popup window 3203 for informing a user that the corresponding function is automatically disabled. If the controller 180 receives a confirmation input 3204 for confirming the information from a user, the controller 180 can automatically disable the function of the movable button pad 602.

Thus, if the function of the movable button pad 602 is automatically disabled by the controller 180, it may be able to automatically uncheck the check box 2501 provided for setting the movable button pad 602 (navigation button) described with reference to FIG. 25 [FIG. 32(*d*), FIG. 32(*e*)]. And, the controller 180 can automatically disable (i.e., stop outputting) the currently outputted movable button pad 602 (or the reduced icon 1202).

Figure 33A:
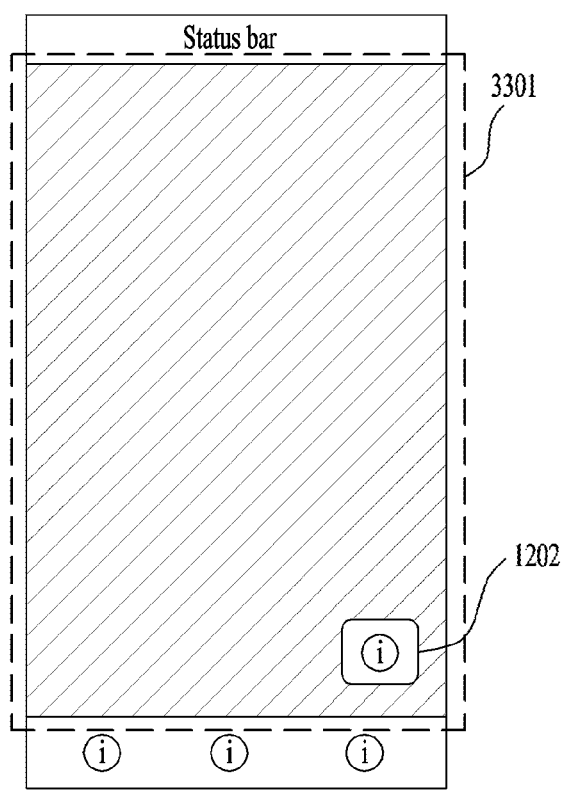
FIG. 33A is a diagram of a region in/to which a reduced icon 1202 is located/shifted.
Figure 33B:
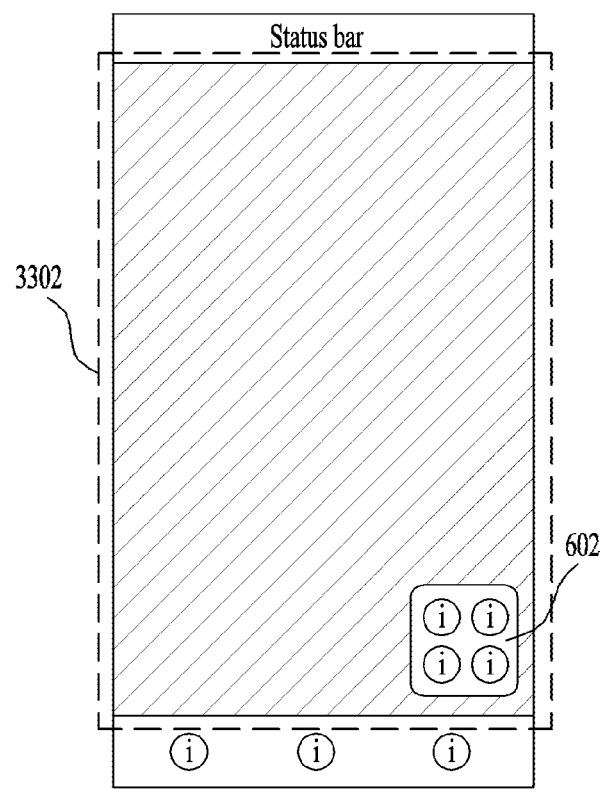
FIG. 33B is a diagram of a region in/to which a movable button pad 602 is located/shifted.

According to one embodiment of the present invention, FIG. 33A is a diagram of a region at/to which a reduced icon 1202 can be situated/shifted and FIG. 33B is a diagram of a region at/to which a movable button pad 602 can be situated/shifted.

Referring to FIG. 33A, according to one embodiment of the present invention, a reduced icon 1202 can be situated/shifted within a region 3301.

Referring to FIG. 33B, according to one embodiment of the present invention, a movable button pad 602 can be situated/shifted within a region 3302.

Figure 34B:
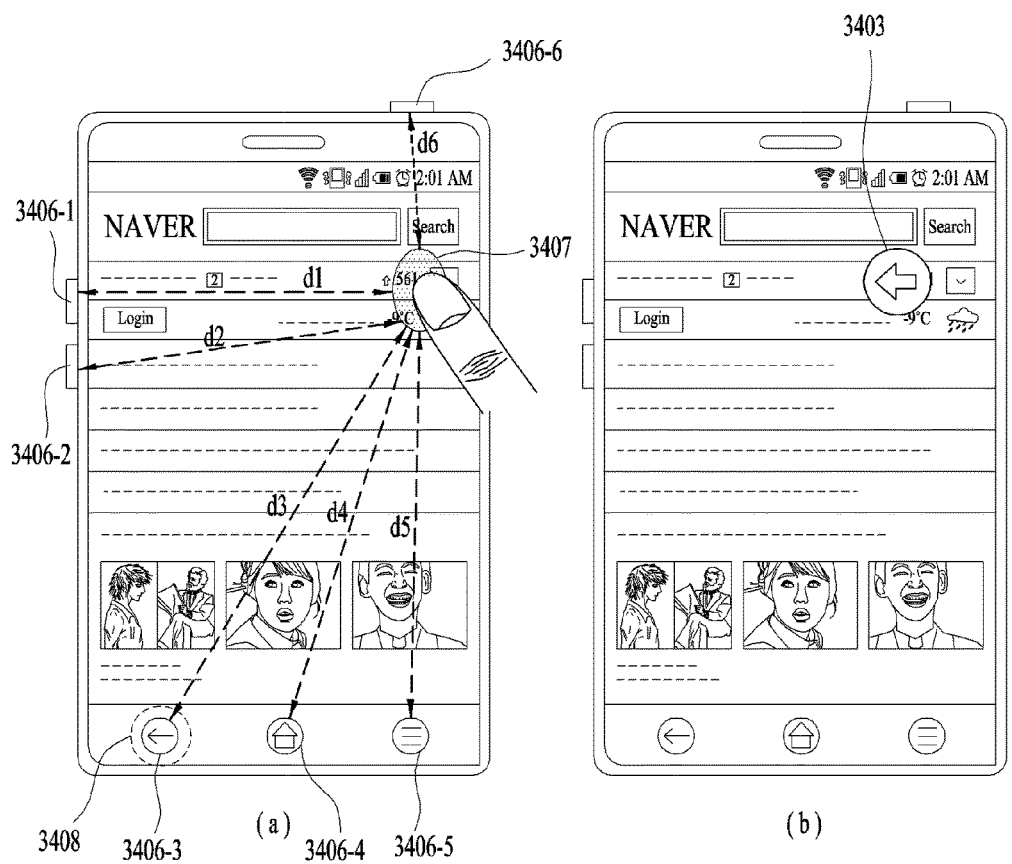
FIG. 34B is a diagram for one example of a method of outputting an assistive icon according to one embodiment of the present invention.

FIG. 34A is a diagram for one example of a method of outputting an assistive icon according to one embodiment of the present invention. And, FIG. 34B is a diagram for one example of a method of outputting an assistive icon according to one embodiment of the present invention.

First of all, the assistive icon means a substitute icon (or a copy icon) outputted nearby a point of receiving a user's assistive icon paging command in order to facilitate a touch to an icon outputted from a touch-difficult region. According to one embodiment of the present invention, an outputted assistive icon is proposed to be outputted by differentiating its type depending on a location of receiving the assistive icon paging command.

In particular, the controller 180 partitions the touchscreen into a plurality of virtual regions and is able to output an icon in a manner of differentiating a type of the outputted icon depending on a region of receiving an assistive icon paging command. In the example shown in FIG. 34A, the touchscreen 151 is partitioned into two virtual regions. And, the two virtual regions are discriminated into a top region 3404 and a bottom region 3401 with reference to a virtual partition bar across the touchscreen 151. If an assistive icon paging command is received by the top region 3404, the controller 180 outputs a $1^{st}$ assistive icon (e.g., volume adjust icons 3406-1 and 3406-2). If an assistive icon paging command is received by the bottom region 3401, the controller 180 outputs a $2^{nd}$ assistive icon (e.g., a backward icon 3403). Meanwhile, the outputted assistive icons shown in FIG. 34 are just exemplary and may be replaced by icons of other types. Moreover, in the example shown in FIG. 34A, the description is made on the assumption of two virtual regions. And, it is apparent to those skilled in the art that the number of the virtual regions can be further subdivided.

FIG. 34A (c) and FIG. 34A (d) are diagrams for a case that the outputted assistive icon is enabled. In particular, FIG. 34A (c) is a diagram of a status that the volume adjust icons 3406-1 and 3406-2 are currently outputted. If the controller 180 receives an input of selecting the assistive icon, the controller 180 enables a function corresponding to the selected assistive icon and is also able to control the assistive icon to stop being outputted. In particular, referring to FIG. 34A (c) and FIG. 34A (d), if the controller 180 receives an input of selecting the volume adjust icon 3406-1, the controller 180 turns up a setting volume of the mobile terminal and is also able to control the volume adjust icons 3406-1 and 3406-2 to stop being outputted. Referring to FIG. 34A (d), the controller 1809 can further display an indicator 3410 indicating that the volume has been turned up.

Meanwhile, according to one embodiment of the present invention, the controller 180 determines a location of receiving an assistive icon paging command and is proposed to output an icon for a button farthest from the determined location. The reason for this is that a touch to the farthest button may be most difficult. Such an embodiment is described in detail with reference to FIG. 34B as follows.

Referring to FIG. 34B (a), a case forming an exterior of the mobile terminal 100 and hardware buttons 3406-1 to 3406-6 provided to the case are illustrated. And an active screen of a web browser application is currently outputted from the touchscreen 151.

According to the embodiment described with reference to FIG. 34B, if an assistive icon paging command is received, it is proposed that a hardware button situated at a location farthest from a location of receiving the corresponding command is outputted as an assistive icon.

Referring to FIG. 34B (a), if an assistive icon paging command 3407 is received at a prescribed location of the touchscreen 151, the controller 180 selects a hardware button situated at a farthest location from the prescribed location. In the example shown in FIG. 34B (a), the hardware button situated at the farthest location is the button 3406-3. In particular, assuming that distances from a plurality of the hardware buttons are set to d1 to d6, respectively, the distance d3 indicating a distance from the button 3406-3 may have a greatest value. Hence, referring to FIG.

34B (b), the controller 180 outputs the button 3406-3 as the assistive icon 3403, thereby raising the user's accessibility to the corresponding button.

Moreover, according to one embodiment of the present invention, an assistive icon may include a hardware button provided to an exterior case of the mobile terminal 100. In case of the hardware button, it frequently happens that it is difficult to manipulate the hardware button using one hand.

As one example of an input of paging an assistive icon, there may be an input 3402 (e.g., a press input) applied in a manner of performing a touch to a corresponding location and then maintaining the touch over a prescribed time.

In the following description of an embodiment, it is discriminated whether a hand of gripping the mobile terminal 100 is a left hand or a right hand. Depending on a result of the discrimination, it is proposed that object(s) currently outputted from the touchscreen 151 can be arranged. And, such a function shall be named an automatic arrangement function. A method of discriminating a left/right hand can refer to the former description with reference to FIG. 9 and its details shall be omitted from the following description.

Figure 35:
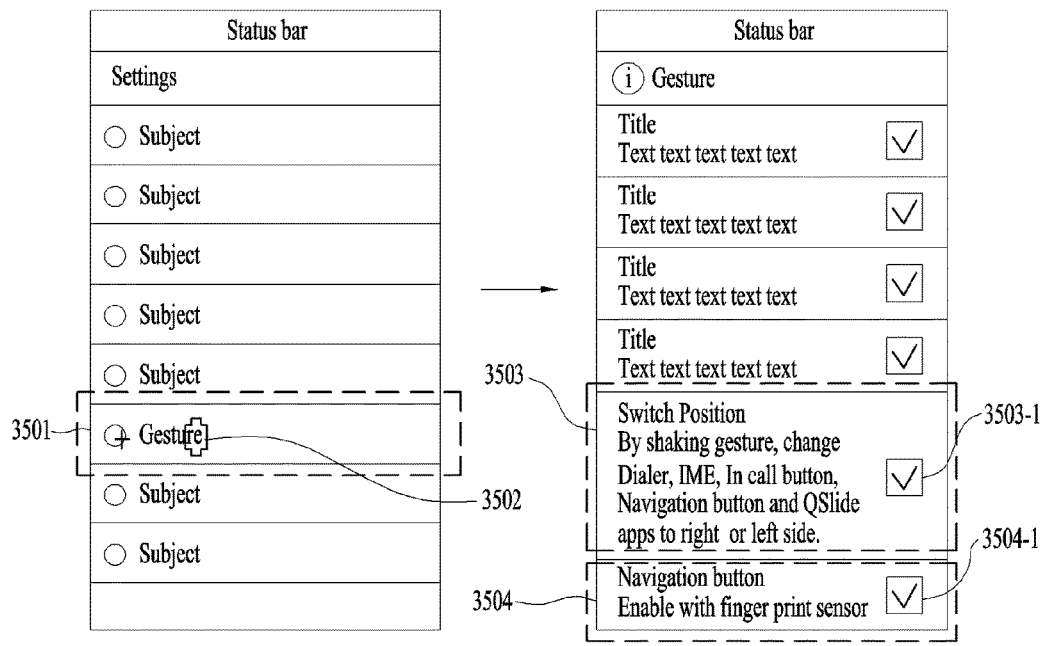
FIG. 35 is a diagram for a status of a setting screen (gesture) for functions capable of enabling a prescribed function through a gesture according to one embodiment of the present invention.

FIG. 35 is a diagram for a status of a setting screen (gesture) for functions capable of enabling a prescribed function through a gesture according to one embodiment of the present invention.

Referring to FIG. 35(*a*), a list of a plurality of setting items to enter a detailed setting is displayed. And, an item 'Gesture' 3501 is displayed on the list. If the controller 180 receives an input 3502 of selecting the item 'Gesture' 3501, the controller 180 can output a screen for setting a detail of the item 'Gesture' 3501 [FIG. 35(*b*)].

The item 'Switch Position' 3503 is the item that indicates the automatic arrangement function according to one embodiment of the present invention. In particular, if the item 'Switch Position' 3503 is enabled, the controller 180 can arrange object(s) currently outputted to the touchscreen depending on a discrimination of a gripping hand.

Figure 42:
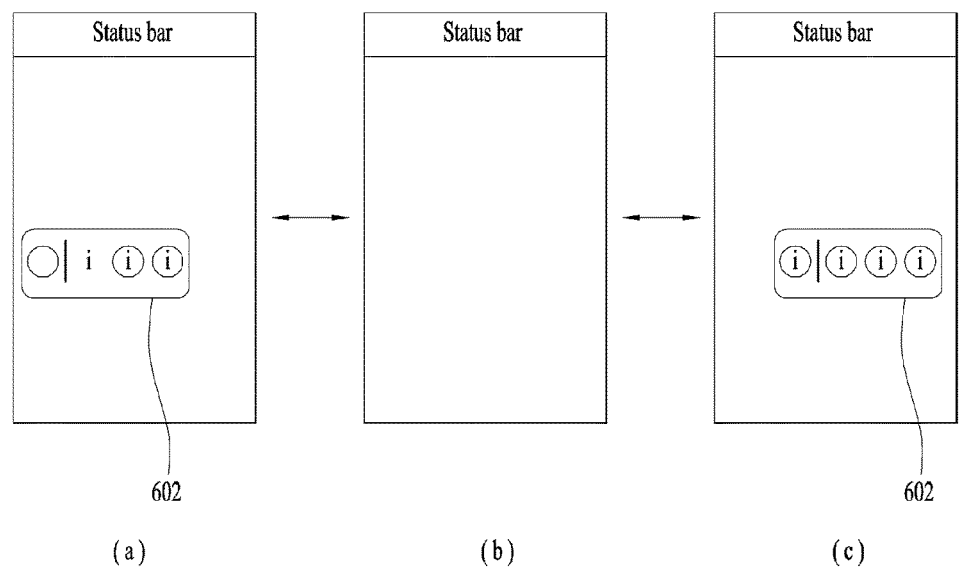

An item 'Navigation Button' 3504 is the item that indicates a function of paging a movable button pad 602 through a fingerprint sensor movable button pad 602. This function shall be described in detail later with reference to FIG. 42.

If a check box 3503-1 for the item 3503 is selected, the controller 180 can enable an automatic arrangement function. In the following description, operations of the automatic arrangement function are described in detail with reference to the accompanying drawings.

FIGS. 36 to 42 are diagrams for examples of an automatic arrangement function according to one embodiment of the present invention.

Figure 36:
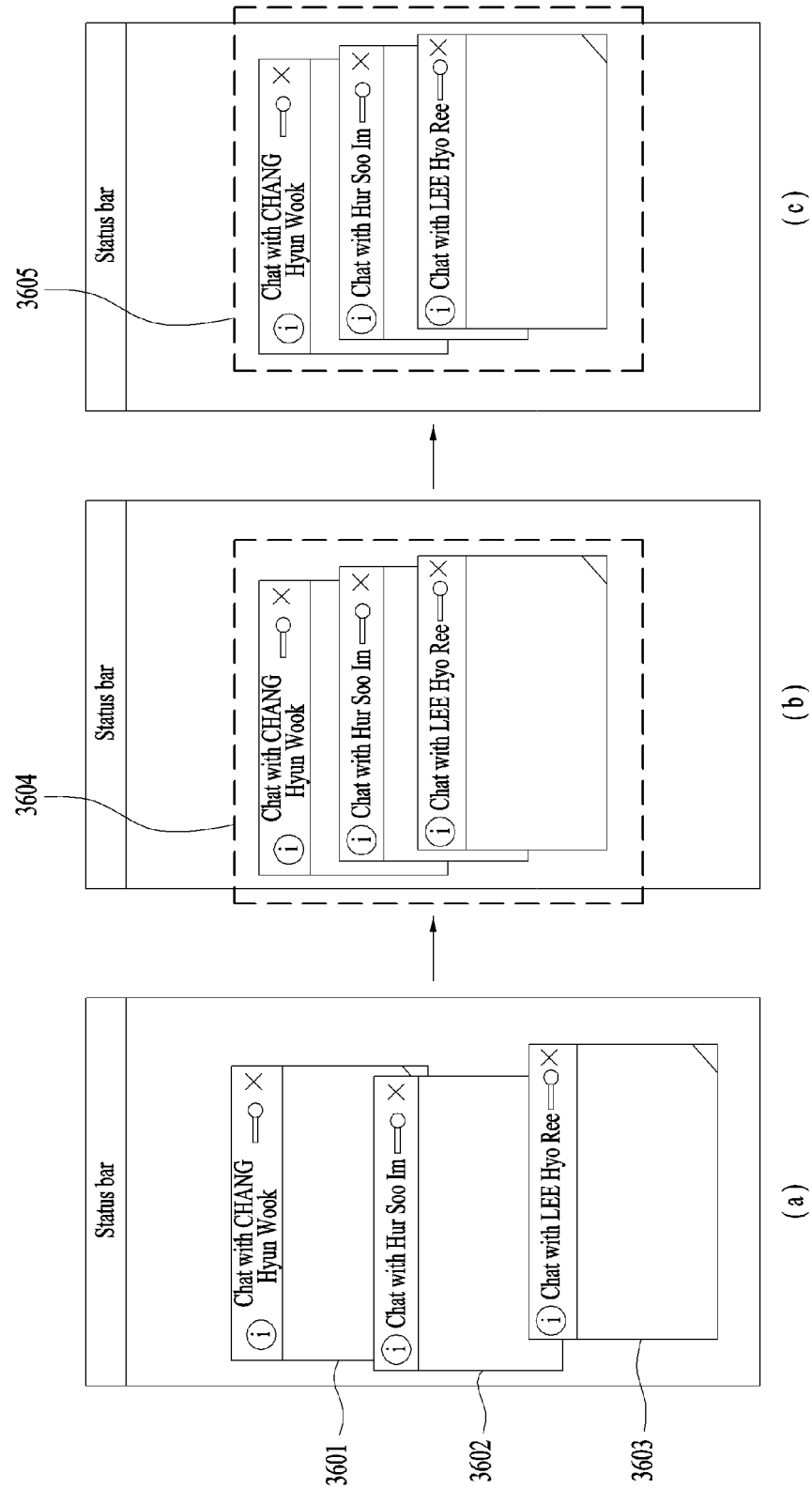
FIGS. 36 to 42 are diagrams for examples of an automatic arrangement function according to one embodiment of the present invention.

Referring to FIG. 36(*a*), the controller 180 currently outputs a plurality of popup windows 3601 to 3603. For instance, each of a plurality of the popup windows 3601 to 3603 may include a chat window with each of a plurality of counterparts. If the controller 180 determines that a user grips the mobile terminal 100 with a left hand (or if the controller 180 determines that the touchscreen 151 is manipulated with a left hand), referring to FIG. 36(*b*), the controller 180 can arrange a plurality of the popup windows 3601 to 3603 in a left region 3604 of the touchscreen 151.

Likewise, if the controller 180 determines that a user grips the mobile terminal 100 with a right hand (or if the controller 180 determines that the touchscreen 151 is manipulated with a right hand), referring to FIG. 36(*c*), the controller 180 can arrange a plurality of the popup windows 3601 to 3603 in a right region 3605 of the touchscreen 151.

Figure 37:
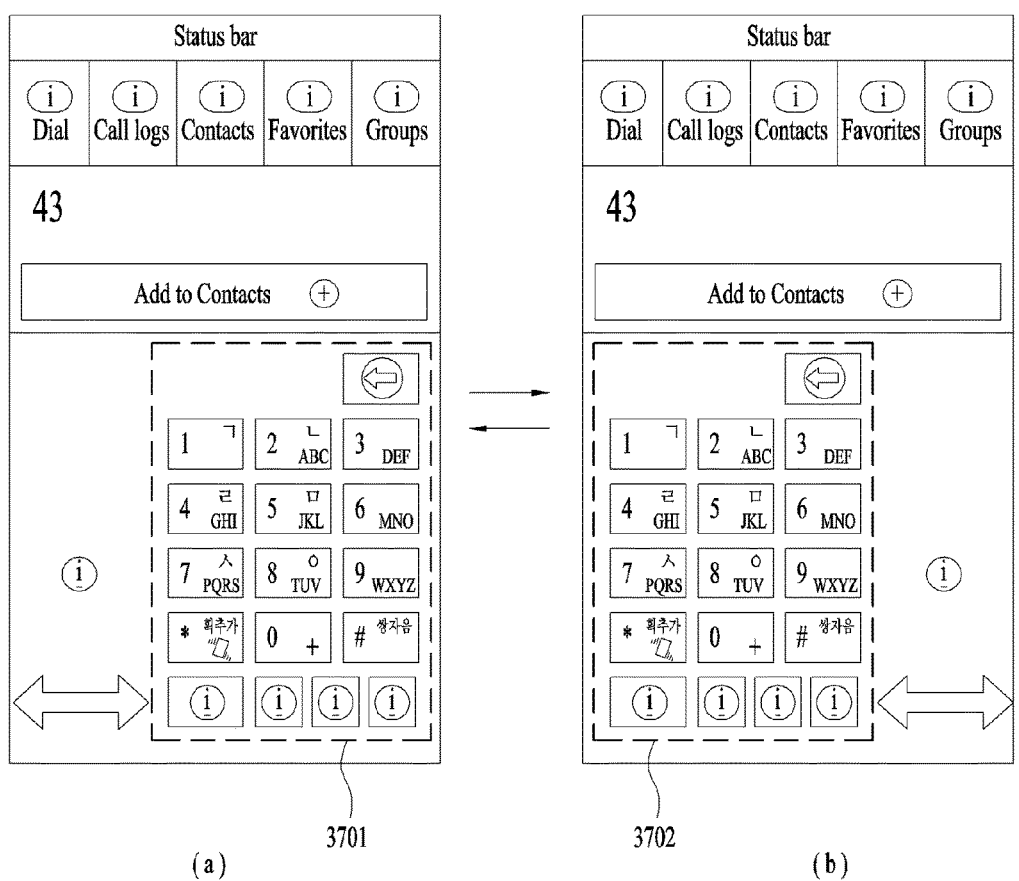

Referring to FIG. 37(*a*) and FIG. 37(*b*), the controller 180 currently outputs a diagram of a status for inputting a phone number through the touchscreen 151. This status diagram shows that a dialer for inputting a phone number is currently outputted.

If the controller 180 determines that a user grips the mobile terminal 100 with a right hand (or if the controller 180 determines that the touchscreen 151 is manipulated with a right hand), referring to FIG. 37(*a*), the controller 180 can arrange the dialer in a right region 3701 of the touchscreen 151.

Likewise, if the controller 180 determines that a user grips the mobile terminal 100 with a left hand (or if the controller 180 determines that the touchscreen 151 is manipulated with a left hand), referring to FIG. 37(*b*), the controller 180 can arrange the dialer in a left region 3702 of the touchscreen 151.

Figure 38:
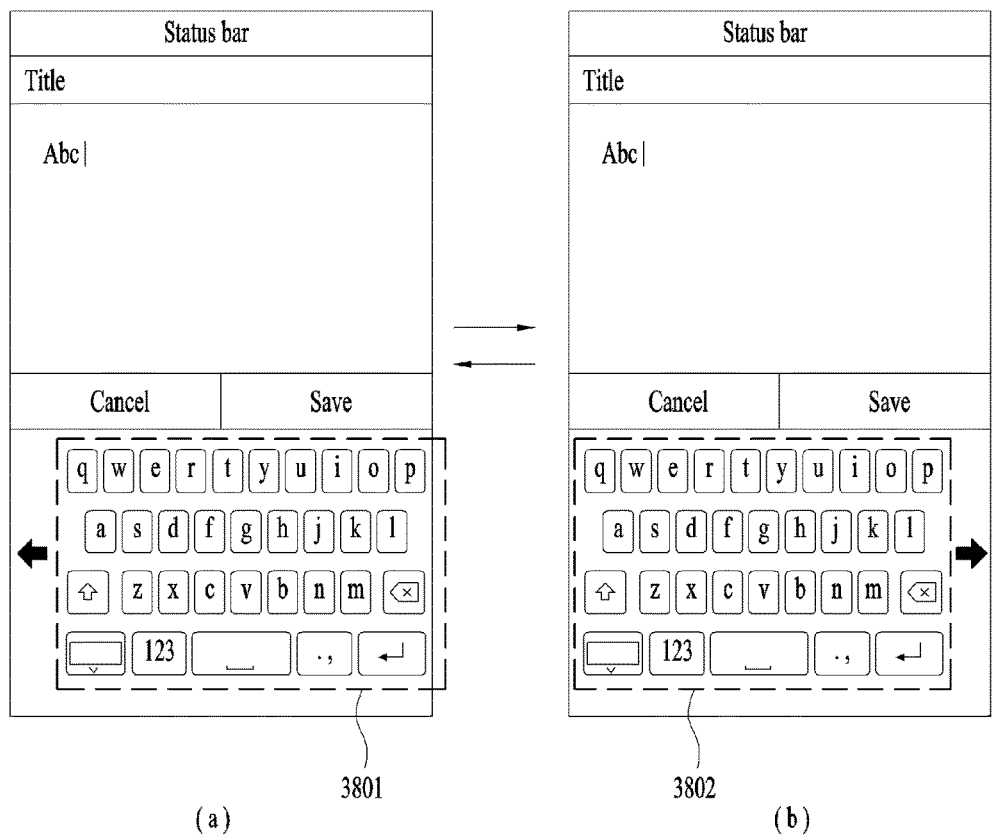

Referring to FIG. 38(*a*) and FIG. 38(*b*), the controller 180 currently outputs a diagram of a status for inputting text data through the touchscreen 151. This status diagram shows that a keypad for inputting text data is currently outputted.

If the controller 180 determines that a user grips the mobile terminal 100 with a right hand (or if the controller 180 determines that the touchscreen 151 is manipulated with a right hand), referring to FIG. 38(*a*), the controller 180 can arrange the keypad in a right region 3801 of the touchscreen 151.

Likewise, if the controller 180 determines that a user grips the mobile terminal 100 with a left hand (or if the controller 180 determines that the touchscreen 151 is manipulated with a left hand), referring to FIG. 38(*b*), the controller 180 can arrange the keypad in a left region 3802 of the touchscreen 151.

Figure 39:
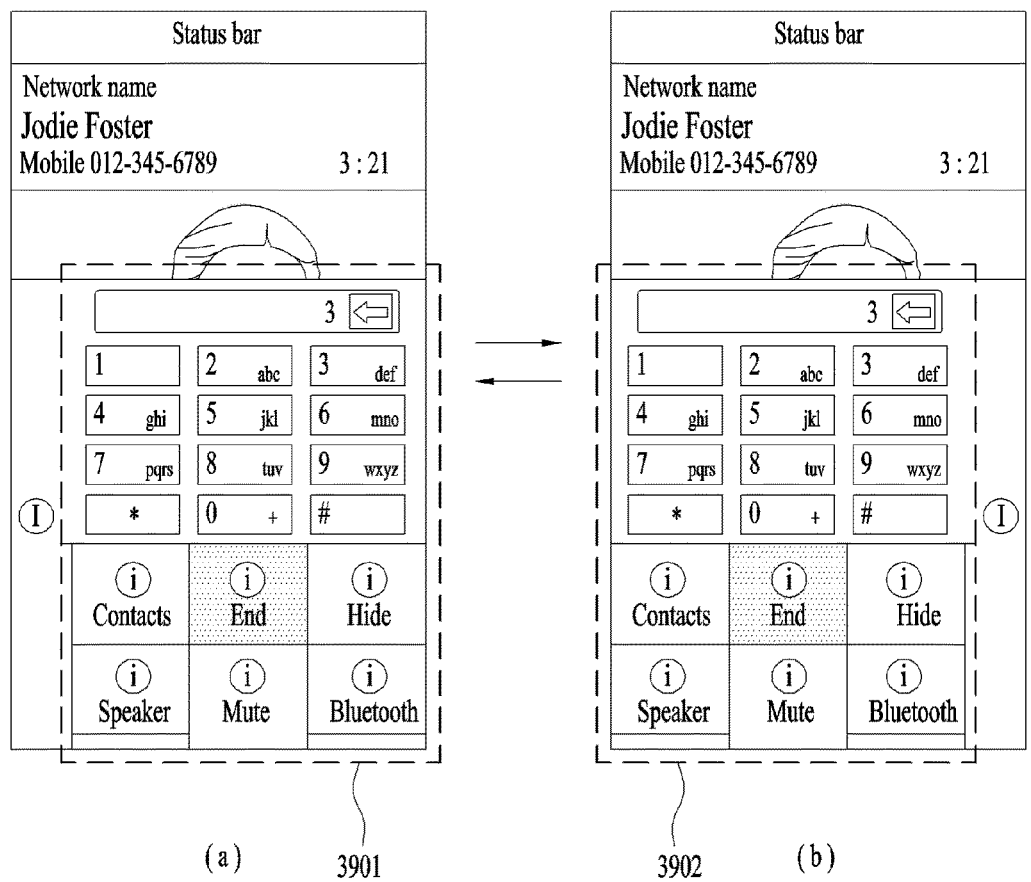

Referring to FIG. 39(*a*) and FIG. 39(*b*), the controller 180 currently outputs a diagram of a status for inputting a phone number through the touchscreen 151. This status diagram shows that a dialer for inputting a phone number is currently outputted in the course of receiving a call through the touchscreen 151.

If the controller 180 determines that a user grips the mobile terminal 100 with a right hand (or if the controller 180 determines that the touchscreen 151 is manipulated with a right hand), referring to FIG. 39(*a*), the controller 180 can arrange the dialer in a right region 3901 of the touchscreen 151.

Likewise, if the controller 180 determines that a user grips the mobile terminal 100 with a left hand (or if the controller 180 determines that the touchscreen 151 is manipulated with a left hand), referring to FIG. 39(*b*), the controller 180 can arrange the dialer in a left region 3902 of the touchscreen 151.

Figure 40:
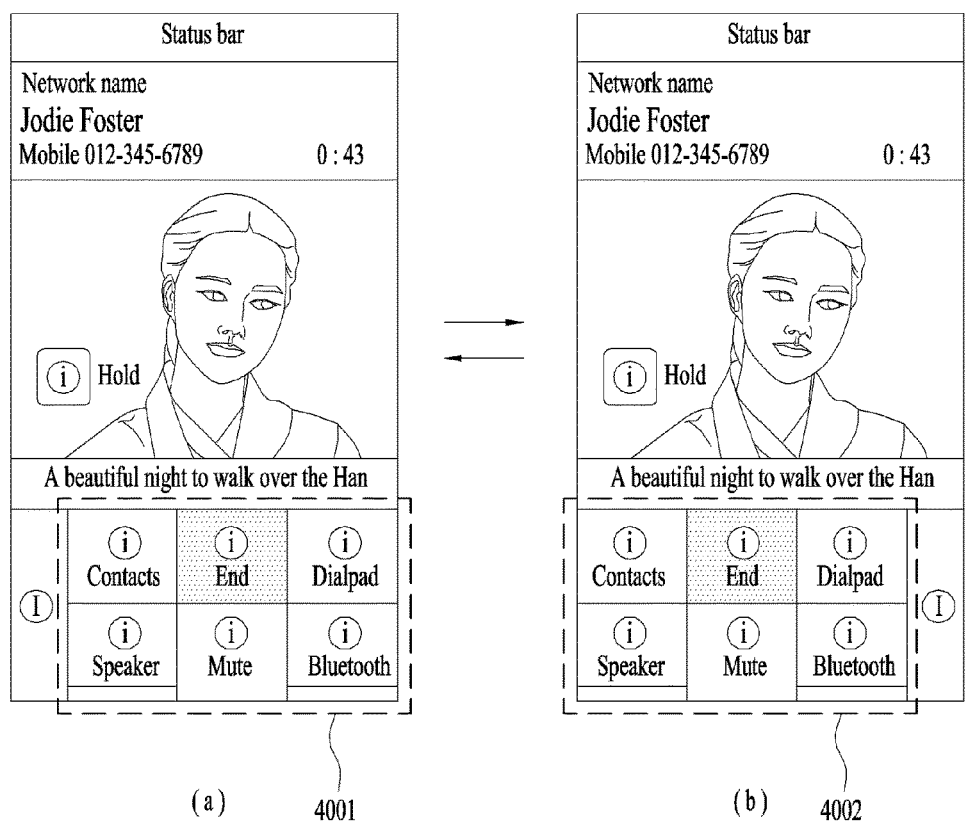
Figure 41:
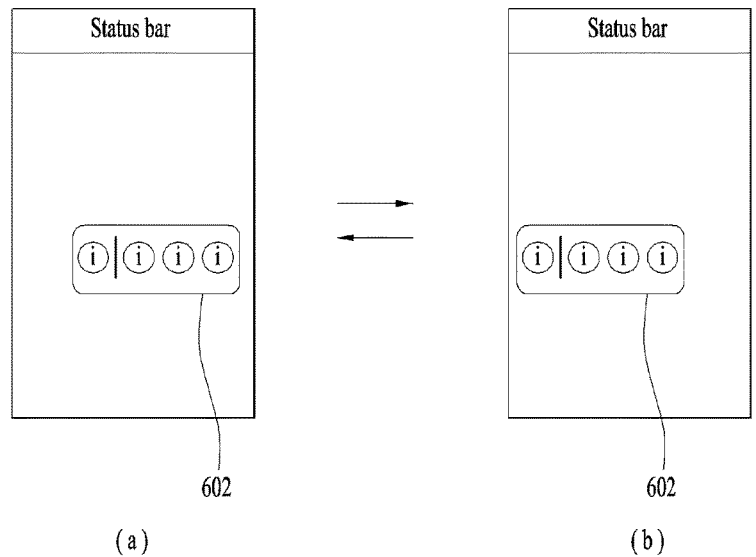

Referring to FIG. 40(*a*) and FIG. 40(*b*), the controller 180 currently outputs a diagram of a status for displaying function buttons for controlling a call connection through the touchscreen 151. This status diagram shows that a command area for selecting function buttons is currently outputted.

If the controller 180 determines that a user grips the mobile terminal 100 with a right hand (or if the controller 180 determines that the touchscreen 151 is manipulated with a right hand), referring to FIG. 40(*a*), the controller 180 can arrange the command area in a right region 4001 of the touchscreen 151.

Likewise, if the controller 180 determines that a user grips the mobile terminal 100 with a left hand (or if the controller 180 determines that the touchscreen 151 is manipulated with a left hand), referring to FIG. 40(*b*), the controller 180 can arrange the command in a left region 4002 of the touchscreen 151.

Referring to FIG. 41(a) and FIG. 41(b), the controller 180 currently outputs a diagram of a status for displaying a movable button pad 602 through the touchscreen 151.

If the controller 180 determines that a user grips the mobile terminal 100 with a right hand (or if the controller 180 determines that the touchscreen 151 is manipulated with a right hand), referring to FIG. 41(a), the controller 180 can arrange the movable button pad 602 in a right region of the touchscreen 151.

Likewise, if the controller 180 determines that a user grips the mobile terminal 100 with a left hand (or if the controller 180 determines that the touchscreen 151 is manipulated with a left hand), referring to FIG. 41(b), the controller 180 can arrange the movable button pad 602 in a left region of the touchscreen 151.

Referring to FIG. 42(b), the controller 180 currently outputs a standby screen. And, assume that the function of 'paging the movable button pad 602 through the fingerprint sensor' described with reference to FIG. 35 is currently enabled.

If the controller receives a flicking input performed on the fingerprint sensor in a left direction [FIG. 42(b)], the controller 180 can display the movable button pad 602 on a left region of the touchscreen [FIG. 42(a)].

If the controller receives a flicking input performed on the fingerprint sensor in a right direction [FIG. 42(b)], the controller 180 can display the movable button pad 602 on a right region of the touchscreen [FIG. 42(c)].

FIG. 43 is a flowchart according to one embodiment of the present invention.

Referring to FIG. 43, in a step S4301, the controller 180 outputs an active screen of a $1^{st}$ application (App) and a function button of the $1^{st}$ application. In a step S4302, the controller 180 determines whether a movable button pad function is enabled. If the movable button pad function is not enabled, the controller 180 can end a controlling method according to one embodiment of the present invention. If the controller 180 determines that the movable button pad function is enabled in the step S4302, the controller 180 can go to a step S4303.

In the step S4303, the controller 180 stands by for a command for adding hardware button(s) to a movable button pad. If the adding command is not received, the controller 180 may go to a step S4305. If the adding command is received, the controller 180 can go to a step S4304. In the step S4304, the controller 180 can add some/all of the hardware buttons to the movable button pad 602.

In the step S4305, the controller 180 stands by for a command for adding function button(s) of the $1^{st}$ application to the movable button pad. If the adding command is not received, the controller 180 may go to a step S4307. If the adding command is received, the controller 180 can go to a step S4306. In the step S4306, the controller 180 can add some/all of the function buttons of the $1^{st}$ application to the movable button pad 602.

In the step S4307, the controller 180 stands by for a command for adding status bar button(s) to the movable button pad. If the adding command is not received, the controller 180 may go to a step S4309. If the adding command is received, the controller 180 can go to a step S4308. In the step S4308, the controller 180 can add some/all of the status bar buttons to the movable button pad 602.

In a step S4309, the controller 180 displays the movable button pad 602 on the touchscreen 151. In this case, the controller 180 can control the movable button pad 602 to be displayed in a manner of including the buttons added in the steps S4304 to S4308.

In a step S4310, while the controller 180 outputs the movable button pad 602, the controller 180 determines whether function button(s) of a $2^{nd}$ application is outputted according to activation of the $2^{nd}$ application. If the $2^{nd}$ application is not activated, the controller 180 can return to the step S4309. If the $2^{nd}$ application is activated, the controller 180 goes to a step S4311. In the step S4311, the controller 180 can display buttons on the movable button pad 602 in a manner of replacing/changing the function buttons of the $1^{st}$ application by/into the function buttons of the $2^{nd}$ application. Thereafter, the controller 180 can return to the step S4309.

Accordingly, embodiments of the present invention provide various effects and/or features.

According to at least one of embodiments of the present invention, a touchscreen in a wide size can be manipulated and controlled more efficiently.

It will be appreciated by those skilled in the art that the present invention can be specified into other form(s) without departing from the spirit or scope of the inventions.

The above-described methods can be implemented in a program recorded medium as computer-readable codes. The computer-readable media may include all kinds of recording devices in which data readable by a computer system are stored. The computer-readable media may include ROM, RAM, CD-ROM, magnetic tapes, floppy discs, optical data storage devices, and the like for example and also include carrier-wave type implementations (e.g., transmission via Internet). Further, the computer may include the controller 180 of the terminal.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:
1. A mobile terminal comprising:
a touchscreen; and
a controller configured to:
cause the touchscreen to display a first movable menu including at least one item of a first menu concurrently displayed at a first designated area of the touchscreen, wherein the first menu comprises a plurality of items respectively associated with a function;
cause the touchscreen to display a second movable menu including at least one item of a second menu concurrently displayed at a second designated area of the touchscreen, wherein the second menu comprises a plurality of items respectively associated with a function;
group the first movable menu and the second movable menu to form a movable group; and
cause the movable group to move from a first location of the touchscreen to a second location of the touchscreen in response to a user input such that the first movable menu and the second movable menu are moved together in response to the user input,
wherein the first movable menu and the second movable menu are movable individually when the first movable menu and the second movable menu are not grouped.

2. The mobile terminal of claim 1, wherein the first menu, the second menu, and the grouped first and second movable menus are displayed concurrently.

3. The mobile terminal of claim 1, wherein the controller is further configured to:
cause the displayed second movable menu to move individually in response to a first touch input received relative to the second movable menu; and
activate a function associated with one of the plurality of items in the second menu in response to a second touch input for selecting a corresponding one of the at least one item in the second movable menu.

4. The mobile terminal of claim 1, wherein the controller is further configured to cause the touchscreen to:
display a first active screen of a first application, the second movable menu displayed on the first active screen and including at least one item associated with the first application;
terminate the displaying of the first active screen and display a second active screen of a second application; and
display at least one item associated with the second application such that the at least one item associated with the first application included in the second movable menu is replaced by the at least one item associated with the second application when the second active screen is displayed instead of the first active screen.

5. The mobile terminal of claim 1, wherein:
the controller is further configured to cause the touchscreen to display a home screen including at least one application activation icon; and
the second movable menu includes at least one item associated with at least one of the at least one application activation icon when the home screen is displayed.

6. The mobile terminal of claim 1, wherein:
the controller is further configured to cause the touchscreen to:
display the first movable menu at a first location of the touchscreen in response to a first touch input initiated at the first designated area and terminated at a location outside the first designated area; and
display the second movable menu at a second location of the touchscreen in response to a second touch input initiated at the second designated area and terminated at a location outside the second designated area, the second touch input received while the first menu, the first movable menu, and the second menu are displayed; and
the first menu, the first movable menu, the second menu, and the second movable menu are displayed concurrently while an active screen of an application is displayed on the touchscreen.

7. The mobile terminal of claim 6, wherein the controller is further configured to partition the touchscreen virtually and select a virtual region of the partitioned touchscreen in response to the first touch input such that the at least one item included in the first movable menu includes only at least one item that is included in the selected virtual region.

8. The mobile terminal of claim 1, further comprising a sensing unit configured to sense whether the mobile terminal is held by a left hand, a right hand, or both hands,
wherein the controller is further configured to cause the touchscreen to display the first movable menu at a different location of the touchscreen based on whether the mobile terminal is held with the left hand or the right hand.

9. The mobile terminal of claim 8, wherein the controller is further configured to cause the touchscreen to terminate the displaying of the first movable menu when the sensing unit senses that the mobile terminal is held with the both hands while the first movable menu is displayed.

10. The mobile terminal of claim 1, wherein the controller is further configured to cause the touchscreen to:
display a reduced icon representing the first movable menu instead of the first movable menu when no input is applied to the first movable menu for more than a threshold time period; and
redisplay the first movable menu when the reduced icon is selected, and
wherein the reduced icon is movable in response to a touch input.

11. The mobile terminal of claim 1, wherein the controller is further configured to cause the touchscreen to display the first movable menu in response to a touch input received relative to the first designated area, the first movable menu displayed at a position designated by the touch input such that the position of the displayed first movable menu is variable according to the designated position.

12. The mobile terminal of claim 1, further comprising a sensing unit configured to sense a position on the touchscreen of an object for touch-manipulating the touchscreen,
wherein the controller is further configured to change a position of the first movable menu displayed on the touchscreen based on the sensed position of the object used to display the first movable menu.

13. The mobile terminal of claim 1, further comprising:
a case configuring an exterior of the mobile terminal; and
at least one hardware button provided to the case,
wherein:
the touchscreen is configured to receive a touch input on a specific position on the touchscreen; and
the controller is further configured to cause the touchscreen to display, at the specific position, a substitute icon representing a hardware button that is located farthest from the specific position in response to the touch input.

14. A method of controlling a mobile terminal comprising a touchscreen, the method comprising:
displaying a first movable menu including at least one item of a first menu concurrently displayed at a first designated area of the touchscreen, wherein the first menu comprises a plurality of items respectively associated with a function;
displaying a second movable menu including at least one item of a second menu concurrently displayed at a second designated area of the touchscreen, wherein the second menu comprises a plurality of items respectively associated with a function;
grouping the first movable menu and the second movable menu to form a movable group; and
moving the movable group from a first location of the touchscreen to a second location of the touchscreen in response to a user input such that the first movable menu and the second movable menu are moved together in response to the user input,
wherein the first movable menu and the second movable menu are movable individually when the first movable menu and the second movable menu are not grouped.

15. The method of claim 14, wherein the first menu, the second menu, and the grouped first and second movable menus are displayed concurrently.

16. The method of claim 14, further comprising:
moving the displayed second movable menu individually in response to a first touch input received relative to the second movable menu; and
activating a function associated with one of the plurality of items in the second menu in response to a second touch input for selecting a corresponding one of the at least one item in the second movable menu.

17. The method of claim 16, further comprising:
displaying a first active screen of a first application, the second movable menu displayed on the first active screen and including at least one item associated with the first application;
terminating the displaying of the first active screen and displaying a second active screen of a second application; and
displaying at least one item associated with the second application such that the at least one item associated with the first application included in the second movable menu is replaced by the at least one item associated with the second application when the second active screen is displayed instead of the first active screen.

18. The method of claim 14, further comprising:
displaying a home screen including at least one application activation icon,
wherein the second movable menu includes at least one item associated with at least one of the at least one application activation icon when the home screen is displayed.

19. The method of claim 14, further comprising:
displaying the first movable menu at a first location of the touchscreen in response to a first touch input initiated at the first designated area and terminated at a location outside the first designated area; and
displaying the second movable menu at a second location of the touchscreen in response to a second touch input initiated at the second designated area and terminated at a location outside the second designated area, the second touch input received while the first menu, the first movable menu, and the second menu are displayed,
wherein the first menu, the first movable menu, the second menu, and the second movable menu are displayed concurrently while an active screen of an application is displayed on the touchscreen.

20. The method of claim 19, further comprising partitioning the touchscreen virtually and selecting a virtual region of the partitioned touchscreen in response to the first touch input such that the at least one item included in the first movable menu includes only at least one item that is included in the selected virtual region.

21. The method of claim 14, further comprising:
sensing, by a sensing unit, whether the mobile terminal is held by a left hand, a right hand, or both hands; and
displaying the first movable menu at a different location of the touchscreen based on whether the mobile terminal is held with the left hand or the right hand.

22. The method of claim 21, further comprising terminating the displaying of the first movable menu when the sensing unit senses that the mobile terminal is held with the both hands while the first movable menu is displayed.

23. The method of claim 14, further comprising:
displaying a reduced icon representing the first movable menu instead of the first movable menu when no input is applied to the first movable menu for more than a threshold time period; and
redisplaying the first movable menu when the reduced icon is selected, and
wherein the reduced icon is movable in response to a second touch input.

24. The method of claim 14, further comprising displaying the first movable menu in response to a touch input received relative to the first designated area, the first movable menu displayed at a position designated by the touch input such that the position of the displayed first movable menu is variable according to the designated position.

25. The method of claim 14, further comprising:
sensing, by a sensing unit, sense a position on the touchscreen of an object for touch-manipulating the touchscreen; and
changing a position of the first movable menu displayed on the touchscreen based on the sensed position of the object used to display the first movable menu.

26. The method of claim 14, further comprising:
receiving a touch input on a specific position on the touchscreen; and
displaying, at the specific position, a substitute icon representing a hardware button that is located farthest from the specific position in response to the touch input,
wherein the hardware button is provided to a case configuring an exterior of the mobile terminal.

* * * * *